(12) United States Patent
Hatakeyama et al.

(10) Patent No.: US 7,872,080 B2
(45) Date of Patent: Jan. 18, 2011

(54) PROCESSES FOR PRODUCING A CATALYST COMPONENT FOR ADDITION POLYMERIZATION, A CATALYST AND AN ADDITION POLYMER

(75) Inventors: Takeshi Hatakeyama, Sodegaura (JP); Takuya Ogane, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/397,872

(22) Filed: Mar. 4, 2009

(65) Prior Publication Data

US 2009/0227746 A1 Sep. 10, 2009

(30) Foreign Application Priority Data

Mar. 6, 2008 (JP) .............................. 2008-056377

(51) Int. Cl.
*C08F 4/44* (2006.01)
(52) U.S. Cl. ...................................................... 526/160
(58) Field of Classification Search .................. 526/160
See application file for complete search history.

(56) References Cited

U.S. PATENT DOCUMENTS 3,900,457 A   8/1975   Witt

FOREIGN PATENT DOCUMENTS

| EP | 1275662 | * | 12/2001 |
| EP | 1275662 | A1 | 1/2003 |
| JP | 7-88403 | B2 | 9/1995 |

* cited by examiner

*Primary Examiner*—Ling-Siu Choi
*Assistant Examiner*—Sonya Wright
(74) *Attorney, Agent, or Firm*—Panitch Schwarze Belisario & Nadel LLP

(57) ABSTRACT

A production process of a polymerization catalyst component includes contacting compound (a) such as diethyl zinc represented by the defined formula [1], a compound (b) such as pentafluorophenol, represented by the defined formula [2], a compound (c) such as water, represented by the defined formula [3], and particles (d), such as silica, with one another in a hydrocarbon solvent under an agitator power of 0.05 kW/m$^3$ or greater.

7 Claims, No Drawings

PROCESSES FOR PRODUCING A CATALYST COMPONENT FOR ADDITION POLYMERIZATION, A CATALYST AND AN ADDITION POLYMER

FIELD OF THE INVENTION

The present invention relates to a process for producing a catalyst component for addition polymerization; a process for producing a catalyst for addition polymerization, and a process for producing an addition polymer.

BACKGROUND OF THE INVENTION

A molecular weight of an olefin polymer is usually regulated by supply of hydrogen gas as a molecular weight regulator to a polymerization reactor. In general, the higher a concentration of hydrogen gas in a polymerization reactor is, the smaller a molecular weight of an olefin polymer is.

SUMMARY OF THE INVENTION

However, use of a single-site polymerization catalyst disclosed in U.S. Pat. No. 3,900,457 produces an olefin polymer having a small molecular weight, even when a concentration of hydrogen gas is not so high in a polymerization reactor. Therefore, it is usually difficult to regulate a molecular weight of an olefin polymer by a concentration of hydrogen gas in a polymerization reactor.

In view of the above circumstances, the present invention has an object to provide (i) a process for producing a catalyst component for addition polymerization capable of producing an olefin polymer having a large molecular weight, even when a concentration of hydrogen gas is high in a polymerization reactor, (ii) a process for producing a catalyst for addition polymerization, and (iii) a process for producing an addition polymer. Incidentally, it is preferable to produce an olefin polymer having a large molecular weight, even when a concentration of hydrogen gas in a polymerization reactor is high, because a concentration of hydrogen gas can be regulated easily, and a molecular weight of an addition polymer can be designed easily.

The present invention is a process for producing a catalyst component for addition polymerization, comprising the step of contacting a compound (a) represented by the following formula [1], a compound (b) represented by the following formula [2], a compound (c) represented by the following formula [3], and particles (d) comprising an inorganic substance or an organic polymer with one another, in a hydrocarbon solvent under agitation, the agitation being carried out under an agitator power of 0.05 kW/m³ or larger in contacting the particles (d) with the compound (a), (b) or (c), and in all contacting following the above contacting:

wherein $M^1$ is a metal atom of the group 1, 2, 12, 14 or 15 in the periodic table; $L^1$ is a hydrogen atom, a halogen atom or a hydrocarbyl group, and when plural $L^1$s exist, they are the same as or different from one another; m is a number corresponding to the valence of $M^1$; $R^1$ is an electron-withdrawing group or a group containing an electron-withdrawing group, and when plural $R^1$s exist, they are the same as or different from one another; $R^2$ is a hydrocarbyl group or a halogenated hydrocarbyl group; T is an atom of the group 15 or 16 in the periodic table; and t is a number corresponding to the valence of T.

Also, the present invention is a process for producing a catalyst component for addition polymerization, comprising the step of contacting particles (d) with an activation compound in a hydrocarbon solvent under agitation with an agitator power of 0.05 kW/m³ or larger.

Further, the present invention is a process for producing a catalyst for addition polymerization, comprising the step of contacting a catalyst component for addition polymerization produced according to any of the above two processes, a compound of a transition metal of the groups 3 to 11 or the lanthanide series in the periodic table, and an optional organoaluminum compound with one another.

Still further, the present invention is a process for producing an addition polymer, comprising the step of polymerizing an addition polymerizable monomer in the presence of a catalyst for addition polymerization produced according to the above process.

DETAILED DESCRIPTION OF THE INVENTION

Compound (a):

Examples of $M^1$ in the above formula [1] are a lithium atom, a sodium atom, a potassium atom, a rubidium atom, a cesium atom, a beryllium atom, a magnesium atom, a calcium atom, a strontium atom, a barium atom, a zinc atom, a cadmium atom, a mercury atom, a germanium atom, a tin atom, a lead atom, a antimony atom and a bismuth atom. Among them, preferred is a magnesium atom, a calcium atom, a strontium atom, a barium atom, a zinc atom, a germanium atom, a tin atom or a bismuth atom, particularly preferred is a magnesium atom, a zinc atom, a tin atom or a bismuth atom, and most preferred is a zinc atom.

When $M^1$ is a zinc atom, for example, m in the above formula [1] is 2.

Examples of the halogen atom of $L^1$ in the above formula [1] are a fluorine atom, a chlorine atom, a bromine atom and an iodine atom. The hydrocarbyl group of $L^1$ therein is preferably an alkyl group, an aryl group or an aralkyl group.

The above alkyl group of $L^1$ is preferably an alkyl group having 1 to 20 carbon atoms. Examples thereof are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group. Among them, preferred is a methyl group, an ethyl group, an isopropyl group, a tert-butyl group or an isobutyl group. These alkyl groups may be substituted with a halogen atom such as a fluorine atom, a chlorine atom, a bromine atom and an iodine atom. Examples of a $C_{1-20}$ alkyl group substituted with a halogen atom are a fluoromethyl group, a difluoromethyl group, a trifluoromethyl group, a fluoroethyl group, a difluoroethyl group, a trifluoroethyl group, a tetrafluoroethyl group, a pentafluoroethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a 1H,1H-perfluoropropyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group and a 1H,1H-perfluoroeicosyl group; and alkyl groups obtained by changing the term "fluoro" contained in the above alkyl groups to the term "chloro", "bromo" or "iodo". These alkyl groups may be substituted with an alkoxy group such as a methoxy group and an ethoxy group; an aryloxy group such as a phenoxy group; or an aralkyloxy group such as a benzyloxy group.

The above aryl group of $L^1$ is preferably an aryl group having 6 to 20 carbon atoms. Examples thereof are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, preferred is a phenyl group. These aryl groups mat be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The above aralkyl group of $L^1$ is preferably an aralkyl group having 7 to 20 carbon atoms. Examples thereof are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, an (isobutylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a naphthylmethyl group and an anthracenylmethyl group. Among them, preferred is a benzyl group. These aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

$L^1$ in the above formula [1] is preferably a hydrogen atom, an alkyl group or an aryl group, more preferably a hydrogen atom or an alkyl group, and particularly preferably an alkyl group.

Examples of the compound (a) having a zinc atom as $M^1$ are dialky zincs such as dimethyl zinc, diethyl zinc, di-n-propyl zinc, di-n-butyl zinc, diisobutyl zinc, and di-n-hexyl zinc; diaryl zincs such as diphenyl zinc, dinaphthyl zinc and bis(pentafluorophenyl)zinc; dialkenyl zincs such as diallyl zinc; bis(cyclopentadienyl)zinc; halogenated alkyl zincs such as chloromethyl zinc, chloroethyl zinc, chloropropyl zinc, chloro-n-butyl zinc, chloroisobutyl zinc, chloro-n-hexyl zinc, bromomethyl zinc, bromoethyl zinc, bromopropyl zinc, bromo-n-butyl zinc, bromoisobutyl zinc, bromo-n-hexyl zinc, iodomethyl zinc, iodoethyl zinc, iodopropyl zinc, iodo-n-butyl zinc, iodoisobutyl zinc, and iodo-n-hexyl zinc; and zinc halides such as zinc fluoride, zinc chloride, zinc bromide, and zinc iodide.

The compound (a) is preferably dialky zincs, further preferably dimethyl zinc, diethyl zinc, di-n-propyl zinc, di-n-butyl zinc, diisobutyl zinc or di-n-hexyl zinc, and particularly preferably dimethyl zinc or diethyl zinc.

Compounds (b) and (c):

Examples of the atom of the group 15 of T in the above formulas [2] and [3] are a nitrogen atom and a phosphorous atom, and examples of the atom of the group 16 of T therein are an oxygen atom and a sulfur atom. T is preferably a nitrogen atom or an oxygen atom, and particularly preferably an oxygen atom.

When T is an atom of the group 15, t in the above formulas [2] and [3] is 3, and when T is an atom of the group 16, t therein is 2.

The above "electron-withdrawing group" regarding $R^1$ in the above formula [2] means a group having a positive substituent constant (σ) in the Hammet's rule. Examples of the electron-withdrawing group of $R^1$ are a fluorine atom, a chlorine atom, a bromine atom, an iodine atom, a cyano group, a nitro group, a carbonyl group, a sulfone group and a phenyl group. Examples of the group containing an electron-withdrawing group of $R^1$ are halogenated alkyl groups, halogenated aryl groups, (halogenated alkyl)aryl groups, cyanated aryl groups, nitrated aryl groups, ester groups (for example, alkoxycarbonyl groups, aralkyloxycarbonyl groups and aryloxycarbonyl groups), acyl groups and halogenated acyl groups.

Examples of the above halogenated alkyl groups of $R^1$ are a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group and a 1H,1H-perfluoroeicosyl group; and halogenated alkyl groups obtained by changing the term "fluoro" contained in the above halogenated alkyl groups to the term "chloro", "bromo" or "iodo".

Examples of the above halogenated aryl groups of $R^1$ are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group and a 4,5,6,7,8-pentafluoro-2-naphthyl group; and halogenated aryl groups obtained by changing the term "fluoro" contained in the above halogenated aryl groups to the term "chloro", "bromo" or "iodo".

Examples of the above (halogenated alkyl)aryl groups of $R^1$ are a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, and a 2,4,6-tris(trifluoromethyl)phenyl group; and (halogenated alkyl)aryl groups obtained by changing the term "fluoro" contained in the above (halogenated alkyl)aryl groups to the term "chloro", "bromo" or "iodo".

Examples of the above cyanated aryl groups of $R^1$ are a 2-cyanophenyl group, a 3-cyanophenyl group and a 4-cyanophenyl group.

Examples of the above nitrated aryl groups of $R^1$ are a 2-nitrophenyl group, a 3-nitrophenyl group and a 4-nitrophenyl group.

Examples of the above ester groups of $R^1$ are a methoxycarbonyl group, an ethoxycarbonyl group, a n-propoxycarbonyl group, an isopropoxycarbonyl group, a phenoxycarbonyl group, a trifluoromethoxycarbonyl group and a pentafluorophenoxycarbonyl group.

Examples of the above acyl groups and halogenated acyl groups of $R^1$ are a formyl group, an ethanoyl group, a propanoyl group, a butanoyl group, a trifluoroethanoyl group, a benzoyl group, a pentafluorobenzoyl group, a perfluoroethanoyl group, a perfluoropropanoyl group, a perfluorobutanoyl group, a perfluoropentanoyl group, a perfluorohexanoyl group, a perfluoroheptanoyl group, a perfluorooctanoyl group, a perfluorononanoyl group, a perfluorodecanoyl group, a perfluoroundecanoyl group and a perfluorododecanoyl group.

$R^1$ in the formula [2] is preferably a halogenated hydrocarbon group; more preferably a halogenated alkyl group or a halogenated aryl group; further preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphtyl group, a perfluoro-2-naphtyl group, a 4,5,6,7,8-pentafluoro-2-naphtyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group or a pentachlorophenyl group; particularly preferably a fluoroalkyl group or a fluoroaryl group ; and most preferably a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group or a pentafluorophenyl group.

The hydrocarbyl group of $R^2$ in the above formula [3] is preferably an alkyl group, an aryl group or an aralkyl group, and examples thereof are those exemplified for $L^1$ in the above formula [1]. Examples of the halogenated hydrocarbyl group of $R^2$ in the above formula [3] are a halogenated alkyl group, a halogenated aryl group and a (halogenated alkyl)aryl group, and examples thereof are those exemplified for the electron-withdrawing group of $R^1$ in the above formula [2].

$R^2$ in the above formula [3] is preferably a halogenated hydrocarbyl group, and further preferably a fluorinated hydrocarbyl group.

Examples of the compound (b) are amines, phosphines, alcohols, thiols, phenols, thiophenols, naphthols, thionaphthols, and carboxylic acids.

Examples of the above amines and phosphines of the compound (b) are di(fluoromethyl)amine, bis(difluoromethyl) amine, bis(trifluoromethyl)amine, bis(2,2,2-trifluoroethyl) amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, bis(2-fluorophenyl)amine, bis(3-fluorophenyl)amine, bis(4-fluorophenyl)amine, bis(2,6-difluorophenyl)amine, bis(3,5-difluorophenyl)amine, bis(2,4,6-trifluorophenyl)amine, bis(3,4,5-trifluorophenyl)amine, bis(pentafluorophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, bis(3-cyanophenyl) amine, bis(4-cyanophenyl)amine, bis(2-nitrophenyl)amine, bis(3-nitrophenyl)amine, bis(4-nitrophenyl)amine, bis(1H,1H-perfluorobutyl)amine, bis(1H,1H-perfluoropentyl) amine, bis(1H,1H-perfluorohexyl)amine, bis(1H,1H-perfluorooctyl)amine, bis(1H,1H-perfluorododecyl)amine, bis (1H,1H-perfluoropentadecyl)amine, and bis(1H,1H-perfluoroeicosyl)amine; amines obtained by changing the term "fluoro" contained in the above amines to the term "chloro", "bromo" or "iodo"; and phosphines obtained by changing the term "amine" contained in the above amines to the term "phosphine", wherein nitrogen atoms contained in the above amines are changed to phosphorus atoms.

Examples of the above alcohols and thiols of the compound (b) are fluoromethanol, difluoromethanol, trifluoromethanol, 2,2,2-trifluoroethanol, 2,2,2,3,3-pentafluoropropanol, 2,2,2-trifluoro-1-trifluoromethylethanol, 1,1-bis(trifluoromethyl)-2,2,2-trifluoroethanol, 1H,1H-perfluorohexanol, 1H,1H-perfluorooctanol, 1H,1H-perfluorododecanol, 1H,1H-perfluoropentadecanol, and 1H,1H-perfluoroeicosanol; alcohols obtained by changing the term "fluoro" contained in the above alcohols to the term "chloro", "bromo" or "iodo"; and thiols obtained by changing the term "ol" contained in the above alcohols to the term "thiol", wherein oxygen atoms contained in the above alcohols are changed to sulfur atoms.

Examples of the above phenols, naphthols, thiophenols and thionaphthols of the compound (b) are 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 4,5,6,7,8-pentafluoro-2-naphthol, 2-(trifluoromethyl)phenol, 3-(trifluoromethyl)phenol, 4-(trifluoromethyl)phenol, 2,6-bis(trifluoromethyl)phenol, 3,5-bis (trifluoromethyl)phenol, 2,4,6-tris(trifluoromethyl)phenol, 2-cyanophenol, 3-cyanophenol, 4-cyanophenol, 2-nitrophenol, 3-nitrophenol and 4-nitrophenol; phenols obtained by changing the term "fluoro" contained in the above phenols to the term "chloro", "bromo" or "iodo"; thiophenols obtained by changing the term "phenol" contained in the above phenols to the term "thiophenol", wherein oxygen atoms contained in the above phenols are changed to sulfur atoms; naphthols obtained by changing the term "fluoro" contained in the above naphthols to the term "chloro", "bromo" or "iodo"; and thionaphthols obtained by changing the term "naphthol" contained in the above naphthols to the term "thionaphthol", wherein oxygen atoms contained in the above naphthols are changed to sulfur atoms.

Examples of the above carboxylic acids of the compound (b) are pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid and perfluorododecanoic acid.

The compound (b) is preferably amines, alcohols or phenols. Examples of the amines are bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine and bis(pentafluorophenyl)amine. Examples of the alcohols are trifluoromethanol, 2,2,2-trifluoroethanol, 2,2,3,3,3-pentafluoropropanol, 2,2,2-trifluoro-1-trifluoroethanol, and 1,1-bis(trifluoromethyl)-2,2,2-trifluoroetanol. Examples of the phenols are 2-fluorophenol, 3-fluorophenol, 4-fluorophenol, 2,6-difluorophenol, 3,5-difluorophenol, 2,4,6-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol and 2,4,6-tris(trifluoromethyl)phenol.

The compound (b) is more preferably bis(trifluoromethyl)amine, bis(pentafluorophenyl)amine, trifluoromethanol, 2,2,2-trifluoro-1-trifluoromethylethanol, 1,1-bis(trifluoromethyl)-2,2,2-trifluoroetanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol.

The compound (b) is further preferably 3,5-difluorophenol, 3,4,5-trifluorophenol, pentafluorophenol or 1,1-bis(trifluoromethyl)-2,2,2-trifluoroetanol.

Examples of the compound (c) are water, hydrogen sulfide, amines and anilines. Examples of the amines of the compound (c) are alkylamines such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, and n-eicosylamine; allylamine, cyclopentadienylamine; aralkylamines such as benzylamine; fluorine atom-containing amines such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine, and perfluoroeicosylamine; and halogenated alkylamines obtained by changing the term "fluoro" contained in the above fluorine atom-containing amines to the term "chloro", "bromo" or "iodo".

Examples of the above anilines of the compound (c) are aniline, naphthylamine, anthracenylamine, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline, and pentaethylaniline; alkylanilines obtained by changing the term "ethyl" contained in the above ethyl group-containing anilines to the term "n-propyl", "isopropyl", "n-butyl", "sec-butyl", "tert-butyl", "n-pentyl", "neopentyl", "n-hexyl", "n-octyl", "n-decyl", "n-dodecyl" or "n-tetradecyl"; fluorine atom-containing anilines such as 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline and 2,4,6-tri(trifluoromethyl)aniline; and halogen atom-containing anilines obtained by changing the term "fluoro" contained in the above fluorine atom-containing anilines to the term "chloro", "bromo" or "iodo".

The compound (c) is preferably water, hydrogen sulfide, methylamine, ethylamine, n-propylamine, isopropylamine, n-butylamine, sec-butylamine, tert-butylamine, isobutylamine, n-octylamine, aniline, 2,6-xylylamine, 2,4,6-trimethylaniline, naphthylamine, anthracenylamine, benzylamine, trifluoromethylamine, pentafluoroethylamine, perfluoroproylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; and most preferably water or pentafluoroaniline.

Particles (d):

The particles (d) are not particularly limited, as long as they are a solid material insoluble in a solvent used for producing a catalyst component for addition polymerization, or a solvent used for polymerization, both solvents being described hereinafter in detail. The particles (d) are preferably solid materials generally used as carriers, and more preferably inorganic oxides. Among them, preferred are porous materials having a uniform particle diameter. Regarding a particle diameter distribution of the particles (d), a geometric standard deviation of a volume-basis particle diameter distribution of the particles (d) is preferably 2.5 or less, more preferably 2.0 or less, and further preferably 1.7 or less, from a viewpoint of a particle diameter distribution of a granulous addition polymer produced.

Examples of the inorganic material of the particles (d) are inorganic oxides, clay and clay mineral, and a combination of two or more thereof. Examples of the inorganic oxides are $SiO_2$, $Al_2O_3$, $MgO$, $ZrO_2$, $TiO_2$, $B_2O_3$, $CaO$, $ZnO$, $BaO$ and $ThO_2$, and a mixture of two or more thereof such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Among them, preferred is $SiO_2$, $Al_2O_3$, or a combination of $SiO_2$ and $Al_2O_3$, and particularly preferred is $SiO_2$ (silica). The above inorganic oxides may contain a small amount of carbonates, sulfates, nitrates or oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the above clay or clay mineral are kaolin, bentonite, kibushi clay, gaerome clay, allophane, hisingerite, pyrophylite, talc, a mica group, smectite, a montmorillonite group, hectorite, raponite, saponite, vermiculite, a chlorite group, palygorskite, kaolinite, nacrite, dickite, and halloycite. Among them, preferred is smectite, montmorillonite, hectorite, raponite or saponite, and further preferred is montmorillonite or hectorite.

Among those inorganic materials, inorganic oxides are suitably used. Those inorganic materials are preferably dried to contain substantially no water, preferably drying by heating. Inorganic materials, whose water cannot be visually confirmed, are dried by heating at usually 100 to 1,500° C., preferably 100 to 1,000° C., and further preferably 200 to 800° C. Its heating time is not particularly limited, and preferably 10 minutes to 50 hours, more preferably 1 hour to 30 hours. Examples of a drying method by heating are (i) a method of flowing a dry inert gas such as nitrogen and argon at a constant flow rate, and (ii) a method of heating under a reduced pressure.

While inorganic oxides usually have hydroxyl groups on their surfaces, active hydrogen atoms in those hydroxyl groups may be substituted with various kinds of substituents, thereby obtaining modified inorganic oxides. Such modified inorganic oxides can be used as the particles (d) in the present invention. Examples of the modified inorganic oxides are materials obtained by contacting inorganic oxides with trialkylchlorosilanes such as trimethylchlorosilane and tert-butyldimethylchlorosilane; triarylchlorosilanes such as triphenylchlorosilane; dialkyldichlorosilanes such as dimethyldichlorosilane; diaryldichlorosilanes such as diphenyldichlorosilane; alkyltrichlorosilanes such as methyltrichlorosilane; aryltrichlorosilanes such as phenyltrichlorosilane; trialkylalkoxysilanes such as trimethylmethoxysilane; triarylalkoxysilanes such as triphenylmethoxysilane; dialkyldialkoxysilanes such as dimethyldimethoxysilane; diaryldialkoxysilanes such as diphenyldimethoxysilane; alkyltrialkoxysilanes such as methyltrimethoxysilane; aryltrialkoxysilanes such as phenyltrimethoxysilane; tetraalkoxysilanes such as tetramethoxysilane; alkyldisilazane such as 1,1,1,3,3,3-hexamethyldisilazane; tetrachlorosilane; alcohols such as methanol and ethanol; phenol; dialkylmagnesiums such as dibutylmagnesium, butylethylmagnesium and butyloctylmagnesium; or alkyllithiums such as butyllithium.

Further examples of the particles (d) are materials obtained according to a process comprising the steps of (i) contacting an inorganic oxide with a trialkylaluminum, thereby forming the contact product, and (ii) contacting the contact product with dialkylamines such as diethylamine and diphenylamine, alcohols such as methanol and ethanol, or phenol.

Substitution of all hydroxyl groups on the surfaces of inorganic oxide particles with various kinds of substituents may decrease strength of the inorganic oxide particles. Therefore, it is recommended to suitably determine a substitutional ratio of those hydroxyl groups, so as not to decrease the strength too much. A method for controlling the substitutional ratio is not particularly limited, which can be controlled, for example, by changing an amount of a compound (such as trimethylchlorosilane) used for contacting with the inorganic oxide particles.

The inorganic materials are not particularly limited in their average particle diameter, which is usually 1 to 5,000 μm, preferably 5 to 1,000 μm, more preferably 10 to 500 μm, and further preferably 10 to 100 μm. Their pore volume is preferably 0.1 ml/g or more, and more preferably 0.3 to 10 ml/g. Their specific surface area is preferably 10 to 1,000 m²/g, and more preferably 100 to 500 m²/g.

The above organic polymer as the particles (d) is not particularly limited, and may be a combination of two or more kinds of organic polymers. The organic polymer is preferably a polymer containing (i) an active hydrogen-carrying functional group, or (ii) a non-proton-donating Lewis basic functional group, which means a Lewis basic functional group donating no proton.

The above active hydrogen-carrying functional group is not particularly limited, as long as it has an active hydrogen. Examples of the active hydrogen-carrying functional group are a primary amino group, a secondary amino group, an imino group, an amide group, an imide group, a hydrazide group, an amidino group, a hydroxyl group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group, and a carbazolyl group. Among them, preferred is a primary amino group, a secondary amino group, an imino group, an amide group, an imide group, a hydroxyl group, a formyl group, a carboxyl group, a sulfonic acid group or a thiol group, and particularly preferred is a primary amino group, a secondary amino group, an amide group or a hydroxyl group. Those groups may be substituted with a halogen atom or a hydrocarbyl group having 1 to 20 carbon atoms.

The above non-proton-donating Lewis basic functional group is not particularly limited, as long as it has a Lewis base portion containing no active hydrogen atom. Examples of the non-proton-donating Lewis basic functional group are a pyridyl group, an N-substituted imidazolyl group, an N-substituted indazolyl group, a nitrile group, an azido group, an N-substituted imino group, an N,N-substituted amino group, an N,N-substituted aminoxy group, an N,N,N-substituted hydrazino group, a nitroso group, a nitro group, a nitroxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group and a substituted sulfonic acid group. Among them, preferred is a heterocyclic group, and more preferred is an aromatic heterocyclic group having an oxygen atom and/or a nitrogen atom in its ring. Particularly preferred is a pyridyl group, an N-substituted imidazolyl group or an N-substituted indazoyl group, and most preferred is a pyridyl group. Those groups may be substituted with a halogen atom or a hydrocarbyl group having 1 to 20 carbon atoms.

An amount of the active hydrogen-carrying functional group or the non-proton-donating Lewis basic functional group contained in the organic polymer is not particularly limited, and is preferably 0.01 to 50 mmol/g, and more preferably 0.1 to 20 mmol/g, the amount being a molar amount of the functional group per 1 g of the organic polymer.

The above organic polymer containing (i) an active hydrogen-carrying functional group, or (ii) a non-proton-donating Lewis basic functional group can be produced, for example, (1) by homopolymerizing a monomer having both the above active hydrogen-carrying functional group and one or more polymerizable unsaturated groups, or a monomer having both the above non-proton-donating Lewis basic functional group and one or more polymerizable unsaturated groups, which monomers are preferably combined with a crosslinkable monomer having two or more polymerizable unsaturated groups, or (2) by copolymerizing the above functional group-containing monomer with other monomer having a polymerizable unsaturated group, which monomer or other monomer is preferably combined with a crosslinkable monomer having two or more polymerizable unsaturated groups. Examples of the above polymerizable unsaturated group are an alkenyl group such as a vinyl group and an allyl group, and an alkynyl group such as an ethyne group.

Examples of the above monomer having both an active hydrogen-carrying functional group and one or more polymerizable unsaturated groups are a vinyl group-containing primary amine, a vinyl group-containing secondary amine, a vinyl group-containing amide compound, and a vinyl group-containing hydroxyl compound. Specific examples thereof are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol and 3-buten-1-ol.

Examples of the above monomer having a non-proton-donating Lewis basic functional group and one or more polymerizable unsaturated group are vinylpyridine, vinyl(N-substituted)imidazole and vinyl(N-substituted)indazole.

Examples of the above other monomer having a polymerizable unsaturated group are ethylene, $\alpha$-olefins, aromatic vinyl compounds and cyclic olefins. Specific examples of the $\alpha$-olefins, aromatic vinyl compounds and cyclic olefins are propylene, 1-butene, 1-hexene, 4-methyl-1-pentene, styrene, norbornene, and dicyclopentadiene, and a combination of two or more thereof. Among them, preferred is ethylene or styrene.

An example of the above crosslinkable monomer having two or more polymerizable unsaturated groups is divinylbenzene.

The above organic polymers are not particularly limited in their average particle diameter, which is usually 1 to 5,000 μm, preferably 5 to 1,000 μm, and more preferably 10 to 500 μm. They are not particularly limited in their pore volume, which is preferably 0.1 mL/g or more, and more preferably 0.3 to 10 mL/g. They are not particularly limited in their specific surface area, which is preferably 10 to 1,000 $m^2/g$, and more preferably 50 to 500 $m^2/g$.

The above organic polymers are preferably dried to contain substantially no water, preferably drying by heating. Organic polymers, whose water content cannot be visually confirmed, are dried by heating at usually 30 to 400° C., preferably 50 to 200° C., and further preferably 70 to 150 ° C. Its heating time is not particularly limited, and preferably 10 minutes to 50 hours, more preferably 1 hour to 30 hours. Examples of a method of drying by heating are (i) a method of heating under flowing a dry inert gas such as nitrogen and argon at a constant flow rate, and (ii) a method of heating under a reduced pressure.

Catalyst Component for Addition Polymerization:

A contact order in contacting the compound (a), the compound (b), the compound (c) and the particles (d) with one another is not particularly limited. Examples of the contact order are:

(1) a contact order comprising the steps of (i) contacting the compound (a) with the compound (b) to produce a first contact product, (ii) contacting the first contact product with the compound (c) to produce a second contact product, and then, (iii) contacting the second contact product with the particles (d);

(2) a contact order comprising the steps of (i) contacting the compound (a) with the compound (b) to produce a first contact product, (ii) contacting the first contact product with the particles (d) to produce a second contact product, and then, (iii) contacting the second contact product with the compound (c);

(3) a contact order comprising the steps of (i) contacting the compound (a) with the compound (c) to produce a first contact product, (ii) contacting the first contact product with the compound (b) to produce a second contact product, and then, (iii) contacting the second contact product with the particles (d);

(4) a contact order comprising the steps of (i) contacting the compound (a) with the compound (c) to produce a first contact product, (ii) contacting the first contact product with the particles (d) to produce a second contact product, and then, (iii) contacting the second contact product with the compound (b);

(5) a contact order comprising the steps of (i) contacting the compound (a) with the particles (d) to produce a first contact product, (ii) contacting the first contact product with the compound (b) to produce a second contact product, and then, (iii) contacting the second contact product with the compound (c);

(6) a contact order comprising the steps of (i) contacting the compound (a) with the particles (d) to produce a first contact product, (ii) contacting the first contact product with the compound (c) to produce a second contact product, and then, (iii) contacting the second contact product with the compound (b);

(7) a contact order comprising the steps of (i) contacting the compound (b) with the compound (c) to produce a first contact product, (ii) contacting the first contact product with the compound (a) to produce a second contact product, and then, (iii) contacting the second contact product with the particles (d);

(8) a contact order comprising the steps of (i) contacting the compound (b) with the compound (c) to produce a first contact product, (ii) contacting the first contact product with the particles (d) to produce a second contact product, and then, (iii) contacting the second contact product with the compound (a);

(9) a contact order comprising the steps of (i) contacting the compound (b) with the particles (d) to produce a first contact product, (ii) contacting the first contact product with the compound (a) to produce a second contact product, and then, (iii) contacting the second contact product with the compound (c);

(10) a contact order comprising the steps of (i) contacting the compound (b) with the particles (d) to produce a first contact product, (ii) contacting the first contact product with the compound (c) to produce a second contact product, and then, (iii) contacting the second contact product with the compound (a);

(11) a contact order comprising the steps of (i) contacting the compound (c) with the particles (d) to produce a first contact product, (ii) contacting the first contact product with the compound (a) to produce a second contact product, and then, (iii) contacting the second contact product with the compound (b); and

(12) a contact order comprising the steps of (i) contacting the compound (c) with the particles (d) to produce a first contact product, (ii) contacting the first contact product with the compound (b) to produce a second contact product, and then, (iii) contacting the second contact product with the compound (a).

Among the above contact orders (1) to (12), preferred is the contact order (1), (2), (3), (5), (11) or (12); and particularly preferred is the contact order (2) or (5).

In the present invention, the contact of the particles (d) with the compound (a), (b) or (c) is carried out under agitation with an agitator power of 0.05 $kW/m^3$ or larger, and all the contacts following the aforementioned contact are also carried out under an agitator power of 0.05 kW/m³ or larger. Therefore, all the contacts in the above contact orders (5), (6) and (9) to (12) are carried out under an agitator power of 0.05 kW/m³ or larger; the second and third contacts in each of the above contact orders (2), (4) and (8) are carried out under an agitator power of 0.05 kW/m³ or larger; and the third contact in each of the above contact orders (1), (3) and (7) is carried out under an agitator power of 0.05 kW/m³ or larger. The agitator power is usually 0.05 to 50 kW/m³, preferably 0.10 to 10 kW/m³, and further preferably 0.15 to 1.5 kW/m³.

When the agitator power is smaller than 0.05 kW/m³, an addition polymer produced may be small in its molecular weight. When the agitator power is too large, the particles (d) may be crushed by the collision of the particles (d) with agitator impellers, which results in bad particle quality of a granular addition polymer.

Each of the above contact orders (1) to (12) may be followed by the additional step of contacting the final contact product obtained in each of the above contact orders (1) to (12) with the compounds (a) to (c). A contact order in the additional step is not particularly limited, and examples thereof are contact orders obtained by replacing the "particles (d)" in the above contact orders (1) to (12) with the "final contact product". Among them, preferred is the following contact order (13), (14) or (15):

(13) a contact order comprising the steps of (iv) contacting the final contact product with the compound (a) to produce a contact product, (v) contacting the contact product with the compound (b) to produce a contact product, and then, (vi) contacting the contact product with the compound (c);

(14) a contact order comprising the steps of (iv) contacting the final contact product with the compound (b) to produce a contact product, (v) contacting the contact product with the compound (a) to produce a contact product, and then, (vi) contacting the contact product with the compound (c); and

(15) a contact order comprising the steps of (iv) contacting the final contact product with the compound (c) to produce a contact product, (v) contacting the contact product with the compound (b) to produce a contact product, and then, (vi) contacting the contact product with the compound (a).

All the contacts in the above contact orders (13) to (15) are carried out under an agitator power of 0.05 kW/m³ or larger. Each of the final contact products obtained in the contact orders (13) to (15) may be further contacted with the compounds (a) to (c) one or more times, and all the contacts therein are also carried out under an agitator power of 0.05 kW/m³ or larger.

All of the above contacts are carried out preferably in an atmosphere of an inert gas; at usually −100 to 300 ° C., and preferably −80 to 200° C.; for usually 1 minute to 200 hours, and preferably 10 minutes to 100 hours; and with or without a solvent.

When using a solvent, the solvent is preferably a hydrocarbon solvents, and is inert to each of the compounds (a) to (c), the particles (d) and the above contact products. Therefore, solvents used in the respective steps of the above contact orders (1) to (15) are the same as, or different from one another for the following reasons. When solvents are inert to all of the compounds (a) to (c), the particles (d) and the contact products, such solvents can be commonly used in all steps of the contact orders (1) to (15). However, in case of the contact order (1), for example, when solvents are not inert to the compounds (a) and (b), and are inert to the compound (c), the particles (d) and the contact products, such solvents cannot be used in the step (i), and can be used in the steps (ii) and (iii).

Examples of the above solvents are non-polar solvents such as aliphatic hydrocarbons and aromatic hydrocarbons; and polar solvents such as halides, ethers, alcohols, phenols, carbonyl compounds, phosphoric acid derivatives, nitrile compounds, nitro compounds, amines, and sulfur compounds. Specific examples thereof are aliphatic hydrocarbons such as butane, pentane, hexane, heptane, octane, 2,2,4-trimethylpentane and cyclohexane; aromatic hydrocarbons such as benzene, toluene and xylene; halides such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; ethers such as dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran and tetrahydropyran; alcohols such as methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethyleneglycol, triethyleneglycol, and glycerine; phenols such as phenol and p-cresol; carbonyl compounds such as acetone, ethyl methyl ketone, cyclohexanone, acetic anhydride, ethyl acetate, butyl acetate, ethylene carbonate, propylene carbonate, N,N-dimethylformamide, N,N-dimethylacetamide and N-methyl-2-pyrrolidone; phosphoric acid derivatives such as hexamethylphosphate triamide and triethyl phosphate; nitrile compounds such as acetonitrile, propionitrile, succinonitrile and benzonitrile; nitro compounds such as nitromethane and nitrobenzene; amines such as pyridine, piperidine and morpholine; and sulfur compounds such as dimethylsulfoxide and sulfolane.

In case of contact orders such as the above contact orders (1), (3) and (7), wherein:

any two of the compounds (a) to (c) are contacted with each other in the first contact step (i), thereby producing the first contact product;

the remaining compound (a), (b) or (c) is contacted with the first contact product in the second contact step (ii), thereby producing the second contact product; and the particles (d) is finally contacted with the second contact product in the third step (iii);

the first and second contact steps (ii) are preferably carried out in aliphatic hydrocarbon solvents, aromatic hydrocarbon solvents or ether solvents, and the third contact step (iii) is preferably carried out in polar solvents.

An example of an indicator representing polarity of the above polar solvents is an $E_T^N$ value disclosed in C. Reichardt, "Solvents and Solvents Effects in Organic Chemistry", 2nd ed., VCH Verlag (1988). Polar solvents having an $E_T^N$ value of 0.1 to 0.8 are particularly preferable in the present invention. Examples of the polar solvents having such an $E_T^N$ value range are dichloromethane, chloroform, 1,2-dichloroethane, 1,2-dibromoethane, chlorobenzene, bromobenzene, o-dichlorobenzene, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethyleneglycol, triethyleneglycol, acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphate triamide, triethyl phosphate, acetonitrile, propionitrile, succinonitrile, benzonitrile, nitromethane, nitrobenzene, ethylene diamine, pyridine, piperidine, morpholine, dimethylsulfoxide and sulfolane. Among them, preferred is dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzylalcohol, ethylene glycol, propylene glycol, 2-methoxyethanol, 2-ethoxyethanol, diethyleneglycol or triethyleneglycol; particularly preferred is di-n-butyl ether, methyl-tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol or cyclohexanol; and most preferred is tetrahydrofuran, methanol, ethanol, 1-propanol or 2-propanol.

In the contact orders (1), (3) and (7), the above third step of (iii) contacting the particles (d) with the second contact product may be carried out in a mixed solvent of hydrocarbon solvents with polar solvents. Examples of the mixed solvent are the following combinations: hexane/methanol, hexane/ethanol, hexane/1-propanol, hexane/2-propanol, heptane/methanol, heptane/ethanol, heptane/1-propanol, heptane/2-propanol, toluene/methanol, toluene/ethanol, toluene/1-propanol, toluene/2-propanol, xylene/methanol, xylene/ethanol, xylene/1-propanol, xylene/2-propanol. Among them, the combination is preferably hexane/methanol, hexane/ethanol, heptane/methanol, heptane/ethanol, toluene/methanol, toluene/ethanol, xylene/methanol or xylene/ethanol; further preferably hexane/methanol, hexane/ethanol, toluene/methanol toluene/ethanol; and most preferably toluene/ethanol. The toluene/ethanol mixed solvent contains preferably 50 to 90% by volume of toluene and 10 to 50% by volume of ethanol, and further preferably 70 to 85% by volume of toluene and 15 to 30% by volume of ethanol, the total of toluene and ethanol being 100% by volume.

In the contact orders (1), (3) and (7), all the contact steps (i) to (iii) may be carried out in hydrocarbon solvents. In this case, a short time interval is preferable between completion of the second contact step (ii) and beginning of the third contact step (iii). The time interval is preferably 0 to 5 hours, further preferably 0 to 3 hours, and most preferably 0 to 1 hour. The third contact step (iii) is carried out at usually −100 to 40° C., preferably −20 to 20° C., and most preferably −10 to 10° C.

The contact orders (2), (4) to (6), and (8) to (12) contacting the particles (d) in the step (i) or (ii) are carried out in either non-polar solvents or polar solvents. Among them, preferred are non-polar solvents, because non-polar solvents are more efficient than polar solvents in those contact orders, from a viewpoint of supporting the contact product formed by contacting the compounds (a) to (c) with one another on the particles (d).

An amount of the compounds (a) to (c) used is not particularly limited. The compounds (b) and (c) are used preferably in a molar amount represented by the following formula (1), per one mol of the compound (a) used:

$$|\text{valence of } M^1 - \text{molar amount of compound }(b) - 2 \times \text{molar amount of compound }(c)| \leq 1 \quad (1)$$

wherein the "molar amount of compound (b)" is preferably 0.01 to 1.99 mol, more preferably 0.1 to 1.8 mol, further preferably 0.2 to 1.5 mol, and most preferably 0.3 to 1 mol; and therefore, preferable, more preferable, further preferable or most preferable "molar amount of compound (c)" is calculated by assigning the "valence of $M^1$" and the "molar amount of compound (b)" in the formula (1).

Each of the compound (a) and the particles (d) is used in an amount such that one gram of the obtained catalyst component for addition polymerization contains preferably 0.1 mmol or more, and more preferably 0.5 to 20 mmol of the metal atom $M^1$ derived from the compound (a).

In order to promote a reaction among the compounds (a) to (c) (when the particles (d) have hydroxyl groups on their surfaces, the particles (d) also participate in the reaction), the product produced in the final contact step in the above contact orders (1) to (15) is preferably further heated at a higher temperature, for example, by replacing a solvent used in the final contact step with a solvent having a boiling point higher than that of the former solvent.

The catalyst component for addition polymerization produced by the above contact orders (1) to (15) may contain unreacted compounds (a), (b) and (c) or the particles (d). However, those unreacted starting materials are preferably washed away from the catalyst component with a solvent. The washing solvent is the same as, or different from those used in the respective contact steps of the above contact orders (1) to (15). The washing is carried out preferably in an atmosphere of an inert gas, at usually −100 to 300° C., and preferably −80 to 200° C., for usually 1 minute to 200 hours, and preferably 10 minutes to 100 hours.

After the above final contact or final washing, the resultant catalyst component is preferably subjected to distillation away of a solvent contained therein, and then, is preferably dried under a reduced pressure preferably at 0° C. or higher for 1 to 24 hours, more preferably at 0 to 200° C. for 1 to 24 hours, further preferably at 10 to 200° C. for 1 to 24 hours, particularly preferably at 10 to 160° C. for 2 to 18 hours, and most preferably at 15 to 160° C. for 4 to 18 hours.

The following is one example of the process for producing a catalyst component for addition polymerization of the present invention, referring to specific materials as the compounds (a) to (c) and the particles (d), comprising the steps of:

(1) adding a hexane solution of diethyl zinc (compound (a)) to tetrahydrofuran (solvent), and cooling the resultant mixture down to 3° C.;

(2) adding dropwise pentafluorophenol (compound (b)) in an equal molar amount to the compound (a) to the cooled mixture, and agitating the resultant mixture at room temperature for 10 minutes to 24 hours;

(3) adding dropwise water (compound (c)) in a half molar amount to the compound (a) to the mixture, and agitating the resultant mixture at room temperature for 10 minutes to 24 hours;

(4) distilling away the solvent from the mixture, and then drying the remaining material at 120° C. for 8 hours under a reduced pressure, thereby obtaining a solid;

(5) adding silica (particles (d)) and tetrahydrofuran (solvent) to the solid, and agitating the resultant mixture at 40° C. for 2 hours; and (6) washing the resultant solid with tetrahydrofuran, and then drying the washed solid at 120° C. for 8 hours under a reduced pressure, thereby obtaining a catalyst component for addition polymerization in the present invention.

There can also be produced a catalyst component for addition polymerization in the present invention according to a process, which comprises the step of contacting the above particles (d) with an activation compound explained hereinafter in the above hydrocarbon solvent under an agitator power of 0.02 kW/m³ or larger. The hydrocarbon solvent is preferably inert to the activation compound, and is more preferably able to dissolve the activation compound. The solvent is preferably aromatic hydrocarbons such as benzene, toluene and xylene, or aliphatic hydrocarbons such as hexane, heptane and octane, and is further preferably toluene or xylene.

A contact order of the above contacting is not particularly limited; for example, a contact order comprising the steps of (i) dispersing the particles (d) in a hydrocarbon solvent, thereby preparing a dispersion liquid, and (ii) adding an activation compound to the dispersion liquid.

The above contacting is carried out at usually −100 to 200° C., preferably −50 to 150° C., and further preferably −20 to 120° C., and particularly at a low temperature in an early stage of the contacting, in order to prevent an exothermic reaction caused by the contacting. The particles (d) and the activation compound are not particularly limited in their amounts used. When the activation compound is an aluminumoxy compound, the aluminumoxy compound is used in an amount of usually 0.01 to 100 mmol, preferably 0.1 to 20 mmol, and further preferably 1 to 10 mmol in terms of the amount of aluminum atoms contained in the aluminumoxy compound used, per one gram of the particles (d). When the activation compound is an ionic compound or a Lewis acid, the ionic compound or the Lewis acid is used in an amount of usually 0.00001 to 100 mmol, preferably 0.00005 to 10 mmol, and further preferably 0.0025 to 1 mmol, per one gram of the particles (d).

The agitator power is 0.05 kW/m$^3$ or larger as mentioned above, and is usually 0.05 to 50 kW/m$^3$, preferably 0.10 to 10 kW/m$^3$, and further preferably 0.15 to 1.5 kW/m$^3$.

The activation compound is not particularly limited, as long as the compound is usually used as an activation compound for producing a catalyst for addition polymerization. The activation compound is preferably an organoaluminumoxy compound, an ionic compound or a Lewis acid.

The organoaluminumoxy compound is preferably a cyclic alumoxane represented by the following former formula, or a linear alumoxane represented by the following latter formula:

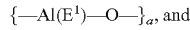

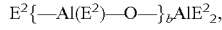

wherein $E^1$ and $E^2$ are a hydrocarbyl group, and all $E^1$s and $E^2$s are the same as, or different from one another; a is an integer of 2 or more, and preferably an integer of 2 to 40; and b is an integer of 1 or more, and preferably an integer of 1 to 40.

The hydrocarbyl group of $E^1$ and $E^2$ is preferably a hydrocarbyl group having 1 to 8 carbon atoms, and more preferably an alkyl group. Examples of $E^1$ and $E^2$ are alkyl groups such as a methyl group, an ethyl group, a n-propyl group, an isopropyl group, a n-butyl group, an isobutyl group, a n-pentyl group, and a neopentyl group. Among them, preferred is a methyl group or an isobutyl group.

The above alumoxanes may be known in the art. They are not particularly limited in their production process, which may be known in the art. Examples thereof are (i) a process comprising the step of contacting water with a solution of a trialkylaluminum such as trimethylaluminum in a suitable organic solvent such as benzene, toluene and an aliphatic hydrocarbon, and (ii) a process comprising the step of contacting a trialkylaluminum such as trimethylaluminum with a crystal water-containing metal salt such as copper sulfate hydrate. Alumoxanes produced according to those processes are usually considered to be a mixture of cyclic alumoxanes with linear alumoxanes.

The above ionic compounds are preferably those represented by the following respective formulas:

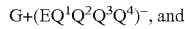

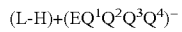

wherein E is a trivalent element of the group 13 or 15 in the periodic table; $Q^1$, $Q^2$, $Q^3$ and $Q^4$ are independently of one another a halogen atom, a hydrocarbyl group, a halogenated hydrocarbyl group, a substituted silyl group, an alkoxy group or a di-substituted amino group, and they are the same as, or different from one another; $G^+$ is an inorganic or organic cation; L is a neutral Lewis base; and $(L-H)^+$ is a Broensted acid.

E is preferably a boron atom, an aluminum atom, a gallium atom, a phosphorus atom, an arsenic atom or an antimony atom, and more preferably a boron atom, an aluminum atom or a gallium atom.

$Q^1$ to $Q^4$ are preferably a halogen atom, a hydrocarbyl group having 1 to 20 carbon atoms, a halogenated hydrocarbyl group having 1 to 20 carbon atoms, a substituted silyl group having 1 to 20 carbon atoms, an alkoxy group having 1 to 20 carbon atoms or a di-substituted amino group having 2 to 20 carbon atoms; more preferably a halogen atom, a hydrocarbyl group having 1 to 20 carbon atoms or a halogenated hydrocarbyl group having 1 to 20 carbon atoms; further preferably a fluorinated $C_{1-20}$ hydrocarbyl group containing one or more fluorine atoms; and particularly preferably a fluorinated $C_{6-20}$ aryl group containing one or more fluorine atoms.

Examples of the inorganic cation of $G^+$ are a ferrocenium cation, an alkyl group-having ferrocenium cation, and a silver cation. An example of the organic cation of $G^+$ is a triphenylmethyl cation. Among them, $G^+$ is preferably a carbenium cation, and particularly preferably a triphenylmethyl cation.

Examples of $(EQ^1Q^2Q^3Q^4)^-$ are tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis(3,5-bistrifluoromethylphenyl)borate.

Examples of compounds represented by the above formula, $G^+(EQ^1Q^2Q^3Q^4)^-$ are ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, ferrocenium tetrakis(pentafluorophenyl)aluminate, 1,1'-dimethylferrocenium tetrakis(pentafluorophenyl)aluminate, silver tetrakis(pentafluorophenyl)aluminate, triphenylmethyl tetrakis(pentafluorophenyl)aluminate, triphenylmethyl tetrakis(3,5-bistrifluoromethylphenyl)aluminate, ferrocenium tetrakis(pentafluorophenyl)galliumate, 1,1'-dimethylferrocenium tetrakis(pentafluorophenyl)galliumate, silver tetrakis(pentafluorophenyl)galliumate, triphenylmethyl tetrakis(pentafluorophenyl)galliumate, and triphenylmethyl tetrakis(3,5-bistrifluoromethylphenyl)galliumate. Among them, preferred is triphenylmethyl tetrakis(pentafluorophenyl)borate, triphenylmethyl tetrakis(pentafluorophenyl)aluminate or triphenylmethyl tetrakis(pentafluorophenyl)galliumate, and further preferred is triphenylmethyl tetrakis(pentafluorophenyl)borate.

Examples of $(L-H)^+$ are a trialkylammonium, an N,N-dialkylanilinium, and a triarylphosphonium.

Examples of compounds represented by the above formula, $(L-H)^+(EQ^1Q^2Q^3Q^4)^-$, are triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphoniumtetrakis(pentafluorophenyl)borate, tri(dimethylphenyl)phosphonium tetrakis(pentafluorophenyl)borate, tri(n-butyl)ammonium tetrakis(pentafluorophenyl)aluminate, N,N-dimethylanilinium tetrakis(pentafluorophenyl)aluminate, tri(n-butyl)ammonium tetrakis(pentafluorophenyl)galliumate, and N,N-dimethylanilinium tetrakis(pentafluorophenyl)galliumate. Among them, preferred is tri(n-butyl)ammonium tetrakis(pentafluorophenyl)borate, N,N-dimethylanilinium tetrakis(pentafluorophenyl)borate, N,N-dimethylanilinium tetrakis(pentafluorophenyl)aluminate, or N,N-dimethylanilinium tetrakis(pentafluorophenyl)galliumate, and further preferred is N,N-dimethylanilinium tetrakis(pentafluorophenyl)borate.

The above Lewis acid compounds are preferably those represented by the following formula:

$$EQ^1Q^2Q^3$$

wherein E and $Q^1$ to $Q^3$ are the same as those defined in the above formulas. E is preferably a boron atom, an aluminum atom, a gallium atom, a phosphorus atom, an arsenic atom or an antimony atom, and more preferably a boron atom, an aluminum atom or a gallium atom.

Examples of compounds represented by the above formula, $EQ^1Q^2Q^3$, are tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tris(pentafluorophenyl)aluminum, tris(2,3,5,6-tetrafluorophenyl)aluminum, tris(2,3,4,5-tetrafluorophenyl)aluminum, tris(3,4,5-trifluorophenyl)aluminum, tris(2,3,4-trifluorophenyl)aluminum, phenylbis(pentafluorophenyl)aluminum, tris(pentafluorophenyl)gallium, tris(2,3,5,6-tetrafluorophenyl)gallium, tris(2,3,4,5-tetrafluorophenyl)gallium, tris(3,4,5-trifluorophenyl)gallium, tris(2,3,4-trifluorophenyl)gallium, and phenylbis(pentafluorophenyl)gallium. Among them, preferred is tris(pentafluorophenyl)borane, tris(pentafluorophenyl)aluminum, or tris(pentafluorophenyl)gallium, and further preferred is tris(pentafluorophenyl)borane.

Equipment for Producing Catalyst Component for Addition Polymerization:

An example of a reactor for producing a catalyst component for addition polymerization in the present invention is a reactor equipped with an agitator, and a feeder for each of the compounds (a) to (c), the particles (d) and a solvent. The agitator is not particularly limited, as long as it has the above agitator power of 0.05 kW/m³ or larger. Examples of an impeller of the agitator are an anchor type impeller, a pitched blade turbine, and a Pfaudler type impeller. In order to improve an agitation effect, the reactor generally has baffle plates on its inner wall.

A method for controlling the above agitator power is not particularly limited. Examples thereof are (i) a method of controlling torque of a torque device-having agitator, and (ii) a method of controlling a rotation speed of an impeller according to the following formula:

$$P_v = N_p \times \rho \times n^3 \times d^5 \div V$$

wherein $P_v$ is an agitator power (kW/m³); $N_p$ is a power number of impeller (dimensionless number); $\rho$ is a density of a solvent (kg/m³); n is a rotation speed of an impeller (sec⁻¹); d is a diameter of an impeller (m); and V is a volume of a reaction liquid (m³). The power number of impeller ($N_p$) can be obtained, for example, from a curve disclosed in Kagakukogaku Binran (5th revised edition published by Maruzen Company, Limited on Mar. 18, 1988), page 895, FIG. 20•8, "Kagakukogaku Binran" (Japanese)being "Chemical Engineering Handbook". In the present invention, the compounds (a) to (c) and the particles (d) are contacted with one another usually under a Reynolds number of $10^4$ or more, and therefore, $N_p$ within a range of the aforementioned Reynolds number is regarded as a constant number determined by a factor such as a type of an impeller, and existence or nonexistence of baffle plates.

The above reactor can also be used for producing a catalyst component for addition polymerization obtained by contacting the particles (d) with the above activation compound in a hydrocarbon solvent.

Transition Metal Compound:

The transition metal compounds used in the present invention are those usually capable of forming single site catalysts. In the present invention, the "single site catalysts" are distinguished from conventional solid catalysts, and mean not only narrow sense single site catalysts capable of producing addition polymers having a narrow molecular weight distribution and high homogeneousness, but also catalysts capable of producing addition polymers having a broad molecular weight distribution and low homogeneousness, those catalysts being produced according to a process similar to a process for producing the narrow sense single site catalysts.

The transition metal compound in the present invention is usually a compound of a transition metal of the groups 3 to 11 or the lanthanide series in the periodic table, and is preferably a transition metal compound represented by the following formula [4], or its μ-oxo type transition metal compound dimer:

$$L^2{}_a M^2 X^1{}_b \qquad [4]$$

wherein $M^2$ is a transition metal atom of groups 3 to 11 or the lanthanide series; $L^2$ is a cyclopentadiene-containing anionic group or a hetero atom-containing group, and when two or more $L^2$s exist, they may be linked to one another directly or through a group containing a carbon atom, a silicone atom, a nitrogen atom, an oxygen atom, a sulfur atom or a phosphorus atom; $X^1$ is a halogen atom, a hydrocarbyl group (excluding the above cyclopentadiene-containing anionic group) or a hydrocarbyloxy group; a is a number satisfying $0 < a \leq 8$; and b is a number satisfying $0 < b \leq 8$.

Examples of $M^2$ are a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and an ytterbium atom. Among them, preferred is a titanium atom, a zirconium atom, a hafnium atom, a vanadium atom, a chromium atom, an iron atom, a cobalt atom or a nickel atom, more preferred is a titanium atom, a zirconium atom or a hafnium atom, and particularly preferred is a zirconium atom.

Examples of the cyclopentadiene-containing anionic group of $L^2$ in the formula [4] are (substituted) cyclopentadienyl groups, (substituted) indenyl groups and (substituted) fluorenyl groups. Specific examples thereof are a cyclopentadienyl group, a methylcyclopentadienyl group, an ethylcyclopentadienyl group, a n-butylcyclopentadienyl group, a tert-butylcyclopentadienyl group, a 1,2-dimethylcyclopentadienyl group, a 1,3-dimethylcyclopentadienyl group, a 1-methyl-2-ethylcyclopentadienyl group, a 1-methyl-3-ethylcyclopentadienyl group, a 1-tert-butyl-2-methylcyclopentadienyl group, a 1-tert-butyl-3- methylcyclopentadienyl group, a 1-methyl-2-isopropylcyclopentadienyl group, a 1-methyl-3-isopropylcyclopentadienyl group, a 1-methyl-2-n-butylcyclopentadienyl group, a 1-methyl-3-n-butylcyclopentadienyl group, an 1,2,3-trimethylcyclopentadienyl group, an 1,2,4-trimethylcyclopentadienyl group, a tetramethylcyclopentadienyl group, a pentamethylcyclopentadienyl group, an indenyl group, a 4,5,6,7-tetrahydroindenyl group, a 2-methylindenyl group, a 3-methylindenyl group, a 4-methylindenyl group, a 5-methylindenyl group, a 6-methylindenyl group, a 7-methylindenyl group, a 2-tert-butylindenyl group, a 3-tert-butylindenyl group, a 4-tert-butylindenyl group, a 5-tert-butylindenyl group, a 6-tert-butylindenyl group, a 7-tert-butylindenyl group, a 2,3-dimethylindenyl group, a 4,7-dimethylindenyl group, a 2,4,7-trimethylindenyl group, a 2-methyl-4-isopropylindenyl group, a 4,5-benzindenyl group, a 2-methyl-4,5-benzindenyl group, a 4-phenylindenyl group, a 2-methyl-5-phenylindenyl group, a 2-methyl-4-phenylindenyl group, a 2-methyl-4-naphthylindenyl group, a fluorenyl group, a 2,7-dimethylfluorenyl group and a 2,7-di-tert-butylfluorenyl group.

The hapticity of the ligand contained in the cyclopentadiene-containing anionic group is not particularly limited, as long as the hapticity is available for the cyclopentadiene-containing anionic group. Examples of the hapticity of the ligand are five, four, three, two and one. Among them, preferred is five, three or one, and more preferred is five (namely, $\eta^5$-ligands) or three (namely, $\eta^3$-ligands).

Examples of the hetero atom contained in the above hetero atom-containing group of $L^2$ in the formula [4] are an oxygen atom, a sulfur atom, a nitrogen atom and a phosphorus atom. The hetero atom-containing group is preferably an alkoxy group; an aryloxy group; a thioalkoxy group; a thioaryloxy group; an alkylamino group; an arylamino group; an alkylphosphino group; an arylphosphino group; a chelating ligand; an aromatic heterocyclic group containing an oxygen atom, a sulfur atom, a nitrogen atom or a phosphorus atom in its ring; or an aliphatic heterocyclic group containing the same in its ring.

Examples of the hetero atom-containing group of $L^2$ in the formula [4] are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, catechol, resorcinol, 4-isopropylcatechol, 3-methoxycatechol, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group and a 4,4',6,6'-tetramethyl-2,2'-isobutylidenediphenoxy group.

A further example of the hetero atom-containing group of $L^2$ in the formula [4] is a group represented by the following formula [5]:

[5]

wherein three $R^3$s are independently of one another a hydrogen atom, a halogen atom or a hydrocarbyl group; they are the same as, or different from one another; and any two or more of them may be linked to one another to form a ring.

Examples of $R^3$ are a hydrogen atom, a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group.

A still further example of the hetero atom-containing group of $L^2$ in the formula [4] is a group represented by the following formula [6]:

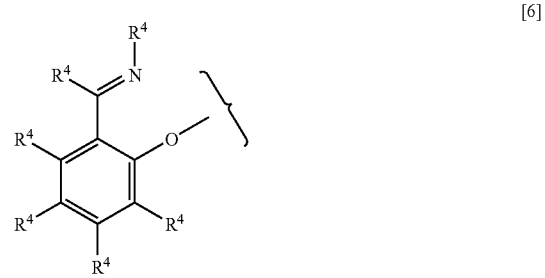

[6]

wherein all $R^4$s are independently of one another a hydrogen atom, a halogen atom, a hydrocarbyl group, a halogenated hydrocarbyl group, a hydrocarbyloxy group, a silyl group or an amino group; they are the same as, or different from one another; and any two or more of them may be linked to one another to form a ring.

Examples of $R^4$ are a hydrogen atom, a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoropmethylphenyl group, a 4-methoxyphenyl group, a 4-pyridyl group, a cyclohexyl group, a 2-isopropylphenyl group, a benzyl group, a methyl group, a triethylsilyl group, a diphenylmethylsilyl group, a 1-methyl-1-phenylethyl group, a 1,1-dimethylpropyl group, a 2-chlorophenyl group and a pentafluorophenyl group.

The above chelating ligand of the hetero atom-containing group of $L^2$ in the formula [4] means a ligand having two or more coordinating positions. Examples of the ligand are acetylacetonate, diimine, oxazoline, bisoxazoline, terpyridine, acylhydrazone, diethylenetriamine, triethylenetetramine, porphyrin, crown ether and cryptate.

Examples of the above heterocyclic group of the hetero atom-containing group of $L^2$ in the formula [4] are a pyridyl group, an N-substituted imidazolyl group and an N-substituted indazolyl group. Among them, preferred is a pyridyl group.

When plural $L^2$s in the formula [4], for example, two $L^2$s therein are linked to each other through a group containing a carbon atom, a silicone atom, a nitrogen atom, an oxygen atom, a sulfur atom or a phosphorus atom, namely, (i) when two cyclopentadiene-containing anionic groups are linked to each other through such a group, (ii) when two hetero atom-containing groups are linked to each other through such a group, or (iii) when a cyclopentadiene-containing anionic group is linked to a hetero atom-containing group through such a group, such a group is a divalent group, wherein each of those two $L^2$s is linked directly to a carbon atom, a silicone atom, a nitrogen atom, an oxygen atom, a sulfur atom or a phosphorus atom, and the total number of atoms on the straight line joining those two $L^2$s is three, two or one. Examples of such a group are an alkylene group such as a methylene group, an ethylene group and a propylene group; a substituted alkylene group such as a dimethylmethylene group (isopropylidene group) and a diphenylmethylene group; a silylene group; a substituted silylene group such as a dimethylsilylene group, a diethylsilylene group, a diphenylsilylene group, a tetramethyldisilylene group, and a dimethoxysilylene group; and a hetero atom such as a nitrogen atom, an oxygen atom, a sulfur atom and a phosphorus atom. Among them, particularly preferred is a methylene group, an ethylene group, a dimethylmethylene group (isopropylidene group), a diphenylmethylene group, a dimethylsilylene group, a diethylsilylene group, a diphenylsilylene group, or a dimethoxysilylene group.

Examples of the halogen atom of $X^1$ in the formula [4] are a fluorine atom, a chlorine atom, a bromine atom and an iodine atom. Examples of the hydrocarbyl group of $X^1$ therein are an alkyl group, an aralkyl group, an aryl group and an alkenyl group. Among them, preferred is an alkyl group having 1 to 20 carbon atoms, an aralkyl group having 7 to 20 carbon atoms, an aryl group having 6 to 20 carbon atoms or an alkenyl group having 3 to 20 carbon atoms.

Examples of the above alkyl group having 1 to 20 carbon atoms of $X^1$ are a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. Among them, preferred is a methyl group, an ethyl group, an isopropyl group, a tert-butyl group, an isobutyl group or an amyl group. Those alkyl groups may be substituted with a halogen atom such as a fluorine atom, a chlorine atom, a bromine atom and an iodine atom. Examples of an alkyl group substituted with a halogen atom are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, and a perbromopropyl group. Those alkyl groups may be substituted with an alkoxy group such as a methoxy group and an ethoxy group; an aryloxy group such as a phenoxy group; or an aralkyloxy group such as a benzyloxy group.

Examples of the above aralkyl group having 7 to 20 carbon atoms of $X^1$ are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl) methylgroup, a (tert-butylphenyl)methylgroup, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl) methyl group, a naphthylmethyl group and an anthracenylmethyl group. Among them, preferred is a benzyl group. Those aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aryl group having 6 to 20 carbon atoms of $X^1$ are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, preferred is a phenyl group. Those aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above alkenyl group having 3 to 20 carbon atoms of $X^1$ are an allyl group, a methallyl group, a crotyl group and a 1,3-diphenyl-2-propenyl group. Among them, preferred is an allyl group or a methallyl group.

Examples of the above hydrocarbyloxy group of $X^1$ are an alkoxy group, an aralkyloxy group and an aryloxy group. Among them, preferred is an alkoxy group having 1 to 20 carbon atoms, an aralkyloxy group having 7 to 20 carbon atoms or an aryloxy group having 6 to 20 carbon atoms.

Examples of the above alkoxy group having 1 to 20 carbon atoms are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group. Among them, preferred is a methoxy group, an ethoxy group, an isopropoxy group or a tert-butoxy group. Those alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aralkyloxy group having 7 to 20 carbon atoms are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl) methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)

methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. Among them, preferred is a benzyloxy group. Those aralkyloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aryloxy group having 6 to 20 carbon atoms are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group. Those aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

$X^1$ in the formula [4] is more preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenoxy group or a benzyl group.

In the above formula [4], each number of "a" and "b" is suitably selected depending upon the valence of $M^2$. When $M^2$ is a titanium atom, a zirconium atom or a hafnium atom, both "a" and "b" are preferably 2.

Examples of the transition metal compounds represented by the above formula [4], wherein the transition metal atom is a titanium atom, a zirconium atom or a hafnium atom, are bis(cyclopentadienyl)titanium dichloride, bis(methylcyclopentadienyl)titanium dichloride, bis(ethylcyclopentadienyl) titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis (1-methyl-2-ethylcyclopentadienyl)titanium dichloride, bis (1-methyl-3-ethylcyclopentadienyl)titanium dichloride, bis (1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl) titaniumdichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis (tetramethylcyclopentadienyl)titanium dichloride, bis (pentamethylcyclopentadienyl)titanium dichloride, bis (indenyl)titanium dichloride, bis(4,5,6,7-tetrahydroindenyl) titanium dichloride, bis(fluorenyl)titanium dichloride, bis (2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methyphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl (indenyl)titanium dichloride, pentamethylcyclopentadienyl (fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis (3-methylcyclopentadienyl)titanium dichloride, dimethylsilylenebis(2-n-butylcyclopentadienyl)titanium dichloride, dimethylsilylenebis (3-n-butylcyclopentadienyl)titanium dichloride, dimethylsilylenebis (2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis (3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis (2,4,7-trimethylindenyl)titaniumdichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene (methylcyclopentadienyl)(indenyl)titanium dichloride, dimethylsilylene(n-butylcyclopentadienyl)(indenyl)titanium dichloride, dimethylsilylene(tetramethylcyclopentadienyl) (indenyl)titanium dichloride, dimethylsilylene (cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(indenyl)titanium dichloride, dimethylsilylene(indenyl) (fluorenyl)titanium dichloride, dimethylsilylenebis (fluorenyl)titanium dichloride,dimethylsilylene (cyclopentadienyl) (tetramethylcyclopentadienyl)titanium dichloride, dimethylsilylene(tetramethylcyclopentadienyl) (fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl (2,6-diisopropylphenyl)titanium dichloride, pentamethylcyclopentadienyl (2,6-tert-butylphenyl)titanium dichloride, indenyl (2,6-diisopropylphenyl)titanium dichloride, fluorenyl(2,6-diisopropylphenyl)titanium dichloride, (tert-butylamido) tetramethylcyclopentadienyl-1,2-ethanediyl-titanium dichloride, (methylamido)tetramethylcyclopentadienyl-1,2-ethanediyl-titanium dichloride, (ethylamido)tetramethylcyclopentadienyl-1,2-ethanediyl-titanium dichloride, (tert-butylamido)tetramethylcyclopentadienyldimethylsilane titanium dichloride, (benzylamido)tetramethylcyclopentadienyldimethylsilane titanium dichloride, (phenylphosphido) tetramethylcyclopentadienyldimethylsilane titanium dichloride, (tert-butylamido)indenyl-1,2-ethanediyl titanium dichloride, (tert-butylamido)tetrahydroindenyl-1,2-ethanediyl titanium dichloride, (tert-butylamido)fluorenyl-1,2-ethanediyl titanium dichloride, (tert-butylamido)indenyldimethylsilane titanium dichloride, (tert-butylamido) tetrahydroindenyldimethylsilane titanium dichloride, (tert-butylamido)fluorenyldimethylsilane titanium dichloride, (dimethylaminomethyl)tetramethylcyclopentadienyl titanium(III) dichloride, (dimethylaminoethyl)tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyl titanium dichloride, (B-dimethylaminoborabenzene)cyclopentadienyl titanium dichloride, cyclopentadienyl(9-mesitylboraanthracenyl)titanium dichloride, 2,2'-thiobis[4-methyl-6-tert-butylphenoxy]titanium dichloride, 2,2'-thiobis[4-methyl-6-(1-methylethyl)phenoxy]titanium dichloride, 2,2'-thiobis[4,6-dimethylphenoxy]titanium dichloride, 2,2'-thiobis (4-methyl-6-tert-butylphenoxy)titaniumdichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis (triisopropylsilyl)naphthalenediamido]titaniumdichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl) methyl]titanium trichloride, [tris(3,5-diethylpyrazolyl) methyl]titanium trichloride, and [tris(3,5-di-tert-butylpyrazolyl)methyl]titanium trichloride; compounds formed by changing the term "titanium" contained in the above compounds to the term "zirconium" or "hafnium"; compounds formed by changing the term "(2-phenoxy)" contained in the above compounds to the term "(3-phenyl-2-phenoxy)", "(3-trimethylsilyl-2-phenoxy)", or "(3-tert-butyldimethylsilyl-2-phenoxy)"; compounds formed by changing the term "dimethylsilylene" contained therein to the term "methylene", "ethylene", "dimethylmethylene(isopropylidene)", "diphenylmethylene", "diethylsilylene", "diphenylsilylene" or "dimethoxysilylene"; compounds formed by changing the term "dichloride" contained therein to the term "difluoride", "dibromide", "diiodide", "dimethyl", "diethyl", "diisopropyl", "diphenyl", "dibenzyl", "dimethoxide", "diethoxide", "di (n-propoxide)", "di(isopropoxide)", "diphenoxide", or "di(pentafluorophenoxide)"; and compounds formed by changing the term "trichloride" contained therein to the term "trifluoride", "tribromide", "triiodide", "trimethyl", "triethyl", "triisopropyl", "triphenyl", "tribenzyl", "trimethoxide", "triethoxide", "tri(n-propoxide)", "tri (isopropoxide)", "triphenoxide", or "tri(pentafluorophenoxide)".

Examples of the transition metal compounds represented by the formula [4], wherein the transition metal atom is a nickel atom, are 2,2'-methylenebis[(4R)-4-phenyl-5,5'-dimethyloxazoline]nickel dibromide, 2,2'-methylenebis[(4R)-4-phenyl-5,5'-diethyloxazoline]nickel dibromide, 2,2'-methylenebis[(4R)-4-phenyl-5,5'-di-n-propyloxazoline]nickel dibromide, 2,2'-methylenebis[(4R)-4-phenyl-5,5'-diisopropyloxazoline]nickel dibromide, 2,2'-methylenebis[(4R)-4-phenyl-5,5'-dicyclohexyloxazoline]nickel dibromide, 2,2'-methylenebis[(4R)-4-phenyl-5,5'-dimethoxyoxazoline] nickel dibromide, 2,2'-methylenebis[(4R)-4-phenyl-5,5'-diethoxyoxazoline]nickel dibromide, 2,2'-methylenebis [(4R)-4-phenyl-5,5'-diphenyloxazoline]nickel dibromide, 2,2'-methylenebis[(4R)-4-methyl-5,5-di-(2-methylphenyl) oxazoline]nickel dibromide, 2,2'-methylenebis[(4R)-4-methyl-5,5-di-(3-methylphenyl)oxazoline]nickel dibromide, 2,2'-methylenebis[(4R)-4-methyl-5,5-di-(4-methylphenyl) oxazoline]nickel dibromide, 2,2'-methylenebis[(4R)-4-methyl-5,5-di-(2-methoxyphenyl)oxazoline]nickel dibromide, 2,2'-methylenebis[(4R)-4-methyl-S,5-di-(3-methoxyphenyl) oxazoline]nickel dibromide, 2,2'-methylenebis[(4R)-4-methyl-5,5-di-(4-methoxyphenyl)oxazoline]nickel dibromide, 2,2'-methylenebis[spiro{(4R)-4-methyloxazoline-5,1'-cyclobutane}]nickel dibromide, 2,2'-methylenebis[spiro{(4R)-4-methyloxazoline-5,1'-cyclopentane}]nickel dibromide, 2,2'-methylenebis[spiro{(4R)-4-methyloxazoline-5,1'-cyclohexane}]nickel dibromide, 2,2'-methylenebis[spiro{ (4R)-4-methyloxazoline-5,1'-cycloheptane}]nickel dibromide, 2,2'-methylenebis[(4R)-4-isopropyl-5,5-dimethyloxazoline]nickel dibromide, 2,2'-methylenebis [(4R)-4-isopropyl-5,5-diethyloxazoline]nickel dibromide, 2,2'-methylenebis[(4R)-4-isopropyl-5,5-di-n-propyloxazoline]nickel dibromide, 2,2'-methylenebis[(4R)-4-isopropyl-5,5-diisopropyloxazoline]nickel dibromide, 2,2'-methylenebis[(4R)-4-isopropyl-5,5-dicyclohexyloxazoline]nickel dibromide, 2,2'-methylenebis[(4R)-4-isopropyl-5,5-diphenyloxazoline]nickel dibromide, 2,2'-methylenebis[(4R)-4-isopropyl-5,5-di-(2-methylphenyl)oxazoline]nickel dibromide, 2,2'-methylenebis[(4R)-4-isopropyl-5,5-di-(3-methylphenyl)oxazoline]nickel dibromide, 2,2'-methylenebis[(4R)-4-isopropyl-5,5-di-(4-methylphenyl)oxazoline]nickel dibromide, 2,2'-methylenebis[(4R)-4-isopropyl-5,5-di-(2-methoxyphenyl)oxazoline]nickel dibromide, 2,2'-methylenebis[(4R)-4-isopropyl-5,5-di-(3-methoxyphenyl)oxazoline]nickel dibromide, 2,2'-methylenebis[(4R)-4-isopropyl-5,5-di-(4-methoxyphenyl)oxazoline]nickel dibromide, 2,2'-methylenebis[spiro{(4R)-4-isopropyloxazoline-5,1'-cyclobutane}]nickel dibromide, 2,2'-methylenebis[spiro{(4R)-4-isopropyloxazoline-5,1'-cyclopentane}]nickel dibromide, 2,2'-methylenebis[spiro{(4R)-4-isopropyloxazoline-5,1'-cyclohexane}]nickel dibromide, 2,2'-methylenebis[spiro{(4R)-4-isopropyloxazoline-5,1'-cycloheptane}]nickel dibromide, 2,2'-methylenebis[(4R)-4-isobutyl-5,5-dimethyloxazoline]nickel dibromide, 2,2'-methylenebis[(4R)-4-isobutyl-5,5-diethyloxazoline]nickel dibromide, 2,2'-methylenebis[(4R)-4-isobutyl-5,5-di-n-propyloxazoline]nickel dibromide, 2,2'-methylenebis[(4R)-4-isobutyl-5,5-diisopropyloxazoline]nickel dibromide, 2,2'-methylenebis[(4R)-4-isobutyl-5,5-dicyclohexyloxazoline]nickel dibromide, 2,2'-methylenebis[(4R)-4-isobutyl-5,5-diphenyloxazoline]nickel dibromide, 2,2'-methylenebis[(4R)-4-isobutyl-5,5-di-(2-methylphenyl)oxazoline]nickel dibromide, 2,2'-methylenebis[(4R)-4-isobutyl-5,5-di-(3-methylphenyl)oxazoline]nickel dibromide, 2,2'-methylenebis[(4R)-4-isobutyl-5,5-di-(4-methylphenyl)oxazoline]nickel dibromide, 2,2'-methylenebis[(4R)-4-isobutyl-5,5-di-(2-methoxyphenyl)oxazoline]nickel dibromide, 2,2'-methylenebis[(4R)-4-isobutyl-5,5-di-(3-methoxyphenyl)oxazoline]nickel dibromide, 2,2'-methylenebis[(4R)-4-isobutyl-5,5-di-(4-methoxyphenyl)oxazoline]nickel dibromide, 2,2'-methylenebis[spiro{(4R)-4-isobutyloxazoline-5,1'-cyclobutane}]nickel dibromide, 2,2'-methylenebis[spiro{(4R)-4-isobutyloxazoline-5,1'-cyclopentane}]nickel dibromide, 2,2'-methylenebis[spiro{(4R)-4-isobutyloxazoline-5,1'-cyclohexane}]nickel dibromide, 2,2'-methylenebis[spiro{(4R)-4-isobutyloxazoline-5,1'-cycloheptane}]nickel dibromide, 2,2'-methylenebis[(4R)-4-tert-butyl-5,5-dimethyloxazoline]nickel dibromide, 2,2'-methylenebis[(4R)-4-tert-butyl-5,5-diethyloxazoline]nickel dibromide, 2,2'-methylenebis[(4R)-4-tert-butyl-5,5-di-n-propyloxazoline]nickel dibromide, 2,2'-methylenebis[(4R)-4-tert-butyl-5,5-diisopropyloxazoline]nickel dibromide, 2,2'-methylenebis[(4R)-4-tert-butyl-5,5-diphenyloxazoline]nickel dibromide, 2,2'-methylenebis[(4R)-4-tert-butyl-5,5-dicyclohexyl oxazoline]nickel dibromide, 2,2'-methylenebis[(4R)-4-tert-butyl-5,5-di-(2-methylphenyl)oxazoline]nickel dibromide, 2,2'-methylenebis[(4R)-4-tert-butyl-5,5-di-(3-methylphenyl)oxazoline]nickel dibromide, 2,2'-methylenebis[(4R)-4-tert-butyl-5,5-di-(4-methylphenyl)oxazoline]nickel dibromide, 2,2'-methylenebis[(4R)-4-tert-butyl-5,5-di-(2-methoxyphenyl)oxazoline]nickel dibromide, 2,2'-methylenebis[(4R)-4-tert-butyl-5,5-di-(3-methoxyphenyl)oxazoline]nickel dibromide, 2,2'-methylenebis[(4R)-4-tert-butyl-5,5-di-(4-methoxyphenyl)oxazoline]nickel dibromide, 2,2'-methylenebis[spiro{(4R)-4-tert-butyloxazoline-5,1'-cyclobutane}]nickel dibromide, 2,2'-methylenebis[spiro{(4R)-4-tert-butyloxazoline-5,1'-cyclopentane}]nickel dibromide, 2,2'-methylenebis[spiro{(4R)-4-tert-butyloxazoline-5,1'-cyclohexane}]nickel dibromide, 2,2'-methylenebis[spiro{(4R)-4-tert-butyloxazoline-5,1'-cycloheptane}]nickel dibromide, 2,2'-methylenebis[(4R)-4-phenyl-5,5-dimethyloxazoline]nickel dibromide, 2,2'-methylenebis[(4R)-4-phenyl-5,5-diethyloxazoline]nickel dibromide, 2,2'-methylenebis[(4R)-4-phenyl-5,5-di-n-propyloxazoline]nickel dibromide, 2,2'-methylenebis[(4R)-4-phenyl-5,5-diisopropyloxazoline]nickel dibromide, 2,2'-methylenebis[(4R)-4-phenyl-5,5-dicyclohexyloxazoline]nickel dibromide, 2,2'-methylenebis[(4R)-4-phenyl-5,5-diphenyloxazoline]nickel dibromide, 2,2'-methylenebis[(4R)-4-phenyl-5,5-di-(2-methylphenyl)oxazoline]nickel dibromide, 2,2'-methylenebis[(4R)-4-phenyl-5,5-di-(3-methylphenyl)oxazoline]nickel dibromide, 2,2'-methylenebis[(4R)-4-phenyl-5,5-di-(4-methylphenyl)oxazoline]nickel dibromide, 2,2'-methylenebis[(4R)-4-phenyl-5,5-di-(2-methoxyphenyl)oxazoline]nickel dibromide, 2,2'-methylenebis[(4R)-4-phenyl-5,5-di-(3-methoxyphenyl)oxazoline]nickel dibromide, 2,2'-methylenebis[(4R)-4-phenyl-5,5-di-(4-methoxyphenyl)oxazoline]nickel dibromide, 2,2'-methylenebis[spiro{(4R)-4-phenyloxazoline-5,1'-cyclobutane}]nickel dibromide, 2,2'-methylenebis[spiro{(4R)-4-phenyloxazoline-5,1'-cyclopentane}]nickel dibromide, 2,2'-methylenebis[spiro{(4R)-4-phenyloxazoline-5,1'-cyclohexane}]nickel dibromide, 2,2'-methylenebis[spiro{(4R)-4-phenyloxazoline-5,1'-cycloheptane}]nickel dibromide, 2,2'-methylenebis[(4R)-4-benzyl-5,5-dimethyloxazoline]nickel dibromide, 2,2'-methylenebis[(4R)-4-benzyl-5,5-diethyloxazoline]nickel dibromide, 2,2'-methylenebis[(4R)-4-benzyl-5,5-di-n-propyloxazoline]nickel dibromide, 2,2'-methylenebis[(4R)-4-benzyl-5,5-diisopropyloxazoline]nickel dibromide, 2,2'-methylenebis[(4R)-4-benzyl-5,5-dicyclohexyloxazoline]nickel dibromide, 2,2'-methylenebis[(4R)-4-benzyl-5,5-diphenyloxazoline]nickel dibromide, 2,2'-methylenebis[(4R)-4-benzyl-5,5-di-(2-methylphenyl)oxazoline]nickel dibromide, 2,2'-methylenebis[(4R)-4-benzyl-5,5-di-(3-methylphenyl)oxazoline]nickel dibromide, 2,2'-methylenebis[(4R)-4-benzyl-5,5-di-(4-methylphenyl)oxazoline]nickel dibromide, 2,2'-methylenebis[(4R)-4-benzyl-5,5-di-(2-methoxyphenyl)oxazoline]nickel dibromide, 2,2'-methylenebis[(4R)-4-benzyl-5,5-di-(3-methoxyphenyl)oxazoline]nickel dibromide, 2,2'-methylenebis[(4R)-4-benzyl-5,5-di-(4-methoxyphenyl)oxazoline]nickel dibromide, 2,2'-methylenebis[spiro{(4R)-4-benzyloxazoline-5,1'-cyclobutane}]nickel dibromide, 2,2'-methylenebis[spiro{(4R)-4-benzyloxazoline-5,1'-cyclopentane}]nickel dibromide, 2,2'-methylenebis[spiro{(4R)-4-benzyloxazoline-5,1'-cyclohexane}]nickel dibromide, and 2,2'-methylenebis[spiro{(4R)-4-benzyloxazoline-5,1'-cycloheptane}] nickel dibromide; and antipodes of the above compounds; compounds formed by reversing a steric configuration of an asymmetric carbon on one oxazoline ring contained in the above bisoxazoline compounds; and compounds formed by changing the term "dibromide" contained therein to the term "difluoride", "dichloride", "diiodide", "dimethyl", "diethyl", "diisopropyl", "diphenyl", "dibenzyl", "dimethoxide", "diethoxide", "di-n-propoxide", "diisopropoxide", "diphenoxide", or "di(pentafluorophenoxide)".

Further examples of nickel compounds represented by the formula [4] are those represented by the following formula:

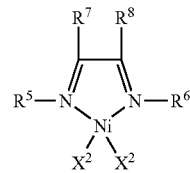

wherein each of $R^5$ and $R^6$ is a 2,6-diisopropylphenyl group; $R^7$ and $R^8$ are independently of each other a hydrogen atom, a methyl group, or a group formed by linking of $R^7$ to $R^8$, which is an upper-half part of the following right-side compound, and is derived from acenaphthene (left-side); and two $X^2$s are independently of each other a fluorine atom, a chlorine atom, a bromine atom, an iodine atom, a methyl group, an ethyl group, a n-propyl group, an isopropyl group, a n-butyl group, a phenyl group, a benzyl grop, a methoxy group, an ethoxy group, or a phenoxy group.

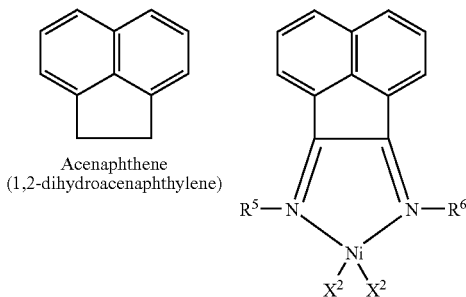

Acenaphthene
(1,2-dihydroacenaphthylene)

There are also exemplified compounds, which are formed by changing "Ni" contained in the above formula to "Pd", "Co", "Rh" or "Ru".

Examples of the transition metal compounds represented by the formula [4], wherein the transition metal atom is an iron atom, are 2,6-bis-[1-(2,6-dimethylphenylimino)ethyl]pyridineiron dichloride, 2,6-bis-[1-(2,6-diisopropylphenylimino)ethyl]pyridineiron dichloride and 2,6-bis-[1-(2-tert-butyl-phenylimino)ethyl]pyridineiron dichloride; and compounds formed by changing the term "dichloride" contained in the above compounds to the term "difluoride", "dibromide", "diiodide", "dimethyl", "diethyl", "dimethoxide", "diethoxide" or "diphenoxide".

Examples of μ-oxo type compounds of transition metal compounds represented by the formula [4] are μ-oxobis[isopropylidene(cyclopentadienyl)(2-phenoxy)titanium chloride], μ-oxobis[isopropylidene(cyclopentadienyl)(3-tert-butyl-5-methyl-2-phenoxy)titanium chloride], μ-oxobis [isopropylidene(methylcyclopentadienyl)(2-phenoxy) titanium chloride], μ-oxobis[isopropylidene (methylcyclopentadienyl)(3-tert-butyl-5-methyl-2-phenoxy) titanium chloride], μ-oxobis[isopropylidene (tetramethylcyclopentadienyl)(2-phenoxy)titanium chloride], μ-oxobis[isopropylidene(tetramethylcyclopentadienyl)(3-tert-butyl-5-methyl-2-phenoxy)titanium chloride], μ-oxobis [dimethylsilylene(cyclopentadienyl)(2-phenoxy)titanium chloride], μ-oxobis[dimethylsilylene (cyclopentadienyl)(3-tert-butyl-5-methyl-2-phenoxy)titanium chloride], μ-oxobis[dimethylsilylene(methylcyclopentadienyl)(2-phenoxy)titanium chloride], μ-oxobis[dimethylsilylene(methylcyclopentadienyl)(3-tert-butyl-5-methyl-2-phenoxy)titanium chloride], μ-oxobis[dimethylsilylene (tetramethylcyclopentadienyl)(2-phenoxy)titanium chloride], and μ-oxobis[dimethylsilylene(tetramethylcyclopentadienyl)(3-tert-butyl-5-methyl-2-phenoxy)titanium chloride]; and compounds formed by changing the term "chloride" contained in the above compounds to the term "fluoride", "bromide", "iodide", "methyl", "ethyl", "isopropyl", "phenyl", "benzyl", "methoxide", "ethoxide", "n-propoxide", "isopropoxide", "phenoxide" or "pentafluorophenoxide".

Examples of transition metal compounds other than those represented by the formula [4] are [hydrotris(3,5-dimethylpyrazolyl)borate]nickel chloride, [hydrotris(3,5-diethylpyrazolyl)borate]nickel chloride, and [hydrotris(3,5-di-tert-butylpyrazolyl)borate]nickel chloride; compounds formed by changing the term "chloride" contained in the above compounds to the term "bromide", "iodide", "methyl", "ethyl", "allyl", "methallyl", "methoxide" or "ethoxide"; and compounds formed by changing the term "nickel" contained in the above compounds to the term "iron" or "cobalt".

Examples of transition metal compounds of a nickel atom are nickel chloride, nickel bromide, nickel iodide, nickel sulfate, nickel nitrate, nickel perchlorate, nickel acetate, nickel trifluoroacetate, nickel cyanide, nickel oxalate, nickel acetylacetonate, bis(ally)nickel, bis(1,5-cyclooctadiene)nickel, dichloro(1,5-cyclooctadiene)nickel, dichlorobis(acetonitrile)nickel, dichlorobis(benzonitrile)nickel, carbonyltris (triphenylphosphine)nickel, dichlorobis(triethylphosphine) nickel, diacetobis(triethylphosphine)nickel, tetrakis (triphenylphosphine)nickel, dichloro[1,2-bis (diphenylphosphino)ethane]nickel, bis[1,2-bis (diphenylphosphino)ethane]nickel, dichloro[1,3-bis (diphenylphosphino)propane]nickel, bis[1,3-bis (diphenylphosphino)propane]nickel, tetraaminenickel nitrate, tetrakis(acetonitrile)nickel tetrafluoroborate, and nickel phthalocyanine.

Examples of transition metal compounds of a vanadium atom are vanadium acetylacetonate, vanadium tetrachloride and vanadium oxytrichloride.

An example of transition metal compounds of a samarium atom is bis(pentamethylcyclopentadienyl)samarium methyltetrahydrofuran.

An example of transition metal compounds of a ytterbium atom is bis(pentamethylcyclopentadienyl)ytterbium methyltetrahydrofuran.

The above-exemplified transition metal compounds may be used in combination of any two or more thereof.

Among the above-exemplified transition metal compounds, preferred are those represented by the above formula [4]. Among them, preferred are compounds of transition metals of the group 4 as $M^2$, and particularly preferred are transition metal compounds having one or more cyclopentadiene-containing anionic groups as $L^2$. Among them, further preferred are zirconium compounds, and particularly preferred are zirconium compounds having two cyclopentadiene-containing anionic groups as $L^2$, those two $L^2$s being linked with each other through a group containing a carbon atom, a silicone atom, an oxygen atom, a sulfur atom or a phosphorus atom.

Transition metal compounds represented by the formula [4] can be produced according to a production process disclosed in a patent literature known in the art, such as JP 6-340684A, JP 7-258321 and WO 95/00562.

Organoaluminum Compound:

The organoaluminum compound used in the present invention may be known in the art. Preferred are organoaluminum compounds represented by the following formula [7]:

$$R^8_d AlY_{3-d} \quad [7]$$

wherein $R^8$ is a hydrocarbyl group, and when plural $R^8$s exist, they are the same as, or different from one another; Y is a hydrogen atom, a halogen atom, an alkoxy group, an aryloxy group, or an aralkyloxy group, and when plural Ys exist, they are the same as, or different from one another; and d is a number satisfying $0<d\leq3$.

$R^8$ is preferably a hydrocarbyl group having 1 to 24 carbon atoms, and more preferably an alkyl group having 1 to 24 carbon atoms. Examples thereof are a methyl group, an ethyl group, a n-propyl group, a n-butyl group, an isobutyl group, a n-hexyl group, a 2-methylhexyl group and a n-octyl group. Among them, preferred is an ethyl group, a n-butyl group, an isobutyl group, a n-hexyl group or a n-octyl group.

Examples of the halogen atom of Y are a fluorine atom, a chlorine atom, a bromine atom and an iodine atom, and preferred is a chlorine atom.

The above alkoxy group of Y is preferably an alkoxy group having 1 to 24 carbon atoms. Examples thereof are a methoxy group, an ethoxy group, a n-propoxy group, an isopropoxy group, a n-butoxy group, a sec-butoxy group, a tert-butoxy group, a n-pentoxy group, and a n-eicoxy group. Among them, preferred is a methoxy group, an ethoxy group or a tert-butoxy group.

The above aryloxy group of Y is preferably an aryloxy group having 6 to 24 carbon atoms. Examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group and an anthracenoxy group.

The above aralkyloxy group of Y is preferably an aralkyloxy group having 7 to 24 carbon atoms. Examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthracenylmethoxy group. Among them, preferred is a benzyloxy group.

Examples of the organoaluminum compounds represented by the formula [7] are trialkylaluminums such as trimethylaluminum, triethylaluminum, tri-n-propylaluminum, tri-n-butylaluminum, triisobutylaluminum, tri-n-hexylaluminum and tri-n-octylaluminum; dialkylaluminum chlorides such as dimethylaluminum chloride, diethylaluminum chloride, di-n-propylaluminum chloride, di-n-butylaluminum chloride, diisobutylaluminum chloride and di-n-hexylaluminum chloride; alkylaluminum dichlorides such as methylaluminum dichloride, ethylaluminum dichloride, n-propylaluminum dichloride, n-butylaluminum dichloride, isobutylaluminum dichloride and n-hexylaluminum dichloride; dialkylaluminum hydrides such as dimethylaluminum hydride, diethylaluminum hydride, di-n-propylaluminum hydride, di-n-butylaluminum hydride, diisobutylaluminum hydride and di-n-hexylaluminum hydride; alkyl(dialkoxy)aluminums such as methy(dimethoxy)aluminum, methyl(diethoxy)aluminum and methyl(di-tert-butoxy)aluminum; dialkyl(alkoxy)aluminums such as dimethy(methoxy)aluminum, dimethyl(ethoxy)aluminum and dimethyl(tert-butoxy)aluminum; alkyl(diaryloxy)aluminums such as methyl(diphenoxy)aluminum, methylbis(2,6-diisopropylphenoxy)aluminum and methylbis(2,6-diphenylphenoxy)aluminum; and dialkyl(aryloxy)aluminums such as dimethyl(phenoxy)aluminum, dimethyl (2,6-diisopropylphenoxy)aluminum and dimethyl (2,6-diphenylphenoxy)aluminum; and a combination of two or more thereof.

Among them, preferred are trialkylaluminums; further preferred is trimethylaluminum, triethylaluminum, tri-n-butylaluminum, triisobutylaluminum, tri-n-hexylaluminum or tri-n-octylaluminum; and particularly preferred is triisobutylaluminum or tri-n-octylaluminum.

Catalyst for Addition Polymerization:

In the process for producing a catalyst for addition polymerization of the present invention, the transition compound is used in an amount of usually $1 \times 10^{-6}$ to $1 \times 10^{-3}$ mol, and preferably $5 \times 10^{-6}$ to $1 \times 10^{-4}$ mol, per 1 g of the catalyst component for addition polymerization. The organoaluminum compound is used in an amount of preferably 0.01 to 10,000 mol, more preferably 0.1 to 5,000 mol, and most preferably 1 to 2,000 mol in terms of a molar amount of aluminum atoms contained in the organoaluminum compound used, per 1 mol of transition metals contained in the transition metal compound used.

Examples of a method for contacting the transition metal compound, the catalyst component for addition polymerization, and the optional organoaluminum compound with one another are (1) a method comprising the steps of (i) feeding the transition metal compound, the catalyst component for addition polymerization, and the optional organoaluminum compound to other catalyst-forming reactor than a polymerization reactor, thereby forming a catalyst for addition polymerization, and (ii) feeding the catalyst for addition polymerization to the polymerization reactor, and (2) a method comprising the steps of (i) feeding the transition metal compound, the catalyst component for addition polymerization, and the optional organoaluminum compound separately to a polymerization reactor, and (ii) contacting them in the polymerization reactor, thereby forming a catalyst for addition polymerization therein. In the method (2), when using all of the transition metal compound, the catalyst component for addition polymerization, and the organoaluminum compound, any two thereof may be preliminary contacted with each other in other reactor than the polymerization reactor, thereby forming a contact product, and then the contact product and the remaining one component may be fed separately to the polymerization reactor, thereby forming a catalyst for addition polymerization.

The transition metal compound, the catalyst component for addition polymerization, and the optional organoaluminum compound are not particularly limited in their feeding state to a catalyst-forming reactor or a polymerization reactor. Examples of the state are (i) a solid state of those components, (ii) a solution state of those components in a hydrocarbon solvent substantially free from an ingredient deactivating those components, such as water and oxygen, and (iii) a suspension (slurry) state of those components in the above hydrocarbon solvent. Examples of the above hydrocarbon solvent are aliphatic hydrocarbons such as butane, pentane, hexane, heptane and octane; aromatic hydrocarbons such benzene and toluene; and halogenated hydrocarbons such as methylene chloride. Among them, preferred are aliphatic hydrocarbons or aromatic hydrocarbons. The above solution or suspension (slurry) contains (i) the catalyst component for addition polymerization in a concentration of usually 0.01 to 1,000 g/liter, and preferably 0.1 to 500 g/liter, (ii) the transition metal compound in a concentration of usually $1 \times 10^{-8}$ to 1 mol/liter, and preferably $5 \times 10^{-7}$ to $5 \times 10^{-2}$ mol/liter, per 1 g of the catalyst component for addition polymerization, and (iii) the organoaluminum compound in a concentration of usually 0.0001 to 100 mol/liter, and preferably 0.01 to 10 mol/liter, in terms of a molar amount of aluminum atoms contained in the organoaluminum compound used.

Addition Polymer:

In the process for producing an addition polymer of the present invention, its polymerization method is not particularly limited. Examples thereof are (i) a gas phase polymerization method polymerizing a gaseous monomer, (ii) a solution or slurry polymerization method polymerizing a monomer dissolved or suspended in a solvent, and (iii) a bulk polymerization method polymerizing a liquid monomer as a solvent. Examples of the above solvent are aliphatic hydrocarbons such as butane, pentane, hexane, heptane and octane; aromatic hydrocarbons such as benzene and toluene; and halogenated hydrocarbons such as methylene chloride. The above polymerization methods (i) to (iii) are carried out in a continuous manner, a batch-wise manner, or a combined manner thereof, and may be carried out in two or more steps having different polymerization conditions from one another.

The above gas phase polymerization method may be known in the art in its polymerization manners and conditions. Its polymerization reactor is usually a fluidized bed reactor, and preferably a fluidized bed reactor having an expanded part therein, and may have an agitator therein. Catalyst components (namely, the transition metal compound, the catalyst component for addition polymerization, and the optional organoaluminum compound) are usually fed to a polymerization reactor, under a water-free condition, together with a gas such as an inert gas (for example, nitrogen and argon), a hydrogen gas and an ethylene gas. Those catalyst components may be fed to a polymerization reactor in their solution or slurry state using a solvent. Those catalyst components are not particularly limited in their feeding order to a polymerization reactor: for example, they are separately fed to a polymerization reactor, or any two of them are preliminary contacted with each other, thereby forming a contact product, and then the contact product and remaining one catalyst component are separately fed to a polymerization reactor.

The above slurry polymerization method may be known in the art in its polymerization manners and conditions. The slurry polymerization method preferably uses a continuous polymerization reactor, wherein (i) materials such as a monomer, a catalyst for addition polymerization, and a diluent (for example, inert diluents (mediums) such as paraffin, cyclopar-affin and an aromatic hydrocarbon) can be continuously fed to the polymerization reactor, and (ii) a produced addition polymer can be taken out continuously or periodically. Examples of the continuous polymerization reactor are a loop reactor, and a vessel-type reactor consisting of two or more agitator-carrying reactors different from one another in their structure and/or conditions, those two or more agitator-carrying reactors being connected with one another in series, in parallel, or in a combination thereof.

A polymerization temperature in a polymerization reactor or a polymerization zone is lower than a melting point of a produced addition polymer, usually about 0 to about 150° C., and preferably 30 to 100° C. A polymerization pressure is usually about 0.1 to about 10 MPa, and preferably 0.5 to 5 MPa. The diluents and polymerization temperature and polymerization pressure are selected such that (i) granulous addition polymers are formed in a polymerization reactor, and (ii) the granulous addition polymers are taken out of the polymerization reactor. In order to satisfy the above (i) and (ii), the polymerization pressure is selected such that (a) a catalyst for addition polymerization kept in a suspension state, and (b) an inert diluent and some parts of monomers both kept in a liquid phase are contacted with each other. A polymerization time is suitably determined by a kind of addition polymer produced and a polymerization apparatus, and is generally 1 minute to 20 hours.

A molecular weight of a produced addition polymer, which relates to melt-flowability of the polymer, can be controlled by various methods known in the art, such as by regulating a polymerization temperature, and by feeding hydrogen.

The above catalyst components and monomers (and if necessary, co-monomer and inert gas) can be fed to a polymerization reactor according to a method known in the art. They are not particularly limited in their feeding order, and they are fed simultaneously or stepwise. The catalyst components may be contacted with one another in an inert atmosphere prior to contacting them with monomers (and co-monomers).

In the polymerization of an addition polymerizable monomer using the above catalyst, which polymerization is referred to as "real polymerization", the above catalyst component is directly used. However, there can be used a pre-polymerized catalyst component in place of the above catalyst component. The pre-polymerized catalyst component is produced, for example, according to a process comprising the step of polymerizing a small amount of an olefin in a slurry state in the presence of the above catalyst component and an organoaluminum compound. It is known fundamentally in the art to use a combination of a catalyst component with an organoaluminum compound and a small amount of an olefin, in order to produce a pre-polymerized catalyst component. Thus produced pre-polymerized catalyst component is covered with the above pre-polymerized olefin polymer on its surface.

Examples of addition polymerizable monomers used in the process for producing an addition polymer of the present invention are olefins having 2 to 20 carbon atoms, diolefins, cyclic olefins, alkenylaromatic hydrocarbons and polar monomers, and a combination of two or more of those monomers. Examples thereof are olefins such as ethylene, propylene, 1-butene, 1-pentene, 4-methyl-1-pentene, 5-methyl-1-hexene, 1-hexene, 1-heptene, 1-octene, 1-nonene and 1-decene; diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadinene, 1,3-octadiene, 1,3-cyclooctadiene and 1,3-cyclohexadiene; cyclic olefins such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclodecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene and 8-cyanotetracyclododecene; alkenylaromatic hydrocarbons such as alkenylbenzenes (e.g. styrene, 2-phenylpropylene, 2-phenylbutene and 3-phenylpropylene), alkylstyrenes (e.g. p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene and p-sec-butylstyrene), bisalkenylbenzenes (e.g. divinylbenzene) and alkenylnaphthalenes (e.g. 1-vinylnaphthalene); and polar monomers such as $\alpha,\beta$-unsaturated carboxylic acids (e.g. acrylic acid, methacrylic acid, fumaric acid, maleic anhydride, itaconic acid, itaconic anhydride and bicyclo(2,2,1)-5-heptene-2,3-dicarboxylic acid), salts of $\alpha,\beta$-unsaturated carboxylic acids with metals (e.g. sodium, potassium, lithium, zinc, magnesium and calcium), $\alpha,\beta$-unsaturated carboxylic acid esters (e.g. methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate), unsaturated dicarboxylic acids (e.g. maleic acid and itaconic acid), vinyl esters (e.g. vinyl acetate, vinyl propionate, vinyl caproate, vinyl caprate, vinyl laurate, vinyl stearate and vinyl trifluoroacetate), and unsaturated carboxylic acid glycidyl esters (e.g. glycidyl acrylate, glycidyl methacrylate and monoglycidyl itaconate).

Examples of the addition polymers in the present invention are homopolymers of the above respective monomers, and copolymers of any two or more of the above monomers. Specific examples thereof are ethylene-propylene copolymers, ethylene-1-butene copolymers, ethylene-1-hexene copolymers, ethylene-1-octene copolymers, and propylene-1-butene copolymers.

The catalyst for addition polymerization produced according to the process of the present invention is suitably used for producing olefin polymers. The olefin polymers are particularly preferably ethylene-$\alpha$-olefin copolymers. Among them, preferred are ethylene-$\alpha$-olefin copolymers having a polyethylene crystalline structure, wherein the $\alpha$-olefin has preferably 3 to 8 carbon atoms such as 1-butene, 1-hexene and 1-octene.

According to the present invention, there are provided (i) a process for producing a catalyst component for addition polymerization capable of producing an olefin polymer having a large molecular weight, even when a concentration of hydrogen gas is high in a polymerization reactor, (ii) a process for producing a catalyst for addition polymerization, and (iii) a process for producing an addition polymer.

EXAMPLE

The present invention is explained in more detail with reference to the following Examples, which do not limit the present invention.

Example 1

(1) Preparation of Particles (d)

A reactor equipped with an agitator was purged with a nitrogen gas. There were put in the reactor (i) 382 mL of toluene (solvent) and (ii) 38.6 g of silica (SYLOPOL 948 manufactured by Davison Co., Ltd.) having an average particle diameter of 55 μm, a pore volume of 1.67 ml/g, and a specific surface area of 325 m$^2$/g, which silica had been previously heated at 300° C. under a nitrogen gas flow. The mixture was agitated, and then was cooled down to 5° C. A solution of 16.3 mL of 1,1,1,3,3,3-hexamethyldisilazane in 28.6 mL of toluene was added dropwise over 30 minutes to the cooled mixture maintained at 5° C. After completion of the dropwise addition, the mixture was agitated at 5° C. for 1 hour, and then at 95° C. for 3 hours. The resultant mixture was subjected to solid-liquid separation, and the separated solid was washed six times with each 331 mL of toluene. There was added 110 mL of toluene (hydrocarbon solvent) to the washed solid, and the mixture was allowed to stand overnight, thereby obtaining a slurry of silica treated with 1,1,1,3,3,3-hexamethyldisilazane in toluene, thus treated silica being hereinafter referred to as "particles (d)".

(2) Preparation of Catalyst Component for Addition Polymerization

The total amount of the above-obtained slurry of the particles (d) in toluene was put in a tank-type glass separable flask having a diameter of 85.2 mm and a volume of 500 mL, and equipped with an anchor-type impeller having a diameter of 75 mm. There was added 58 mL of a hexane solution (concentration: 2.0 mol/L) of diethyl zinc (compound (a)) to the flask, and the resultant mixture was agitated under an agitator power of 0.17 kW/m$^3$. The obtained mixture was cooled down to 5° C. There was added dropwise over 60 minutes a solution of 10.7 g of pentafluorophenol (compound (b)) in 18.2 mL of toluene (solvent) to the cooled mixture maintained at 5° C. After the completion of the dropwise addition, the mixture was agitated under an agitator power of 0.17 kW/m$^3$, at 5° C. for 1 hour, and then at 40° C. for 1 hour. There was added dropwise over 1.5 hours 1.57 mL of water (compound (c)) to the mixture maintained at 5° C. After the completion of the dropwise addition, the mixture was agitated under an agitator power of 0.17 kW/m$^3$, at 5° C. for 1.5 hour, and then at 55° C. for 2 hours. There was further added 39 mL of a hexane solution (concentration: 2.0 mol/L) of diethyl zinc (compound (a)) to the mixture maintained at a room temperature, and the mixture was cooled down to 5° C. There was added dropwise over 60 minutes a solution of 5.72 g of 3,4,5-trifluorophenol (compound (b)) in 12.1 mL of toluene (solvent) to the cooled mixture maintained at 5° C. After the completion of the dropwise addition, the mixture was agitated under an agitator power of 0.17 kW/m$^3$, at 5° C. for 1 hour, and then at 40° C. for 1 hour. There was added dropwise over 1.5 hour 1.04 mL of water (compound (c)) to the mixture maintained at 5° C. After the completion of the dropwise addition, the mixture was agitated under an agitator power of 0.17 kW/m$^3$, at 5° C. for 1.5 hour, at 40° C. for 2 hours, and then at 80° C. for 2 hours.

The obtained reaction mixture was subjected to removal of its clear supernatant liquid, thereby obtaining 193 mL of the remaining reaction mixture. There was added 185 mL of toluene to the reaction mixture. The mixture was agitated, was heated up to 95° C., and then was agitated at 95° C. for 4 hours. The mixture was washed with toluene by repeating the following steps (i) to (v) four times: (i) the mixture was allowed to stand, (ii) when the mixture was separated into an upper layer (slurry) and a lower layer (precipitated solid), the upper layer was removed from the flask, (iii) the liquid contained in the lower layer was filtered off, (iv) the resultant solid was added to 331 mL of toluene, thereby preparing a mixture, and (v) the mixture was heated up to 95° C., and the heated mixture was agitated for 5 minutes. Further, the mixture was washed with hexane by repeating the following steps (i) to (v) three times: (i) the mixture was allowed to stand, (ii) when the mixture was separated into an upper layer (slurry) and a lower layer (precipitated solid), the upper layer was removed from the flask, (iii) the liquid contained in the lower layer was filtered off, (iv) the resultant solid was added to 331 mL of hexane, thereby preparing a mixture, and (v) the mixture was agitated for 5 minutes at a room temperature. There was added 331 mL of hexane to the washed solid, thereby preparing a slurry. All of the slurry was transferred to a flask, and the liquid therein was removed through a filter. The resultant solid was dried under a reduced pressure at 23° C. for one hour, thereby obtaining 70.8 g of a catalyst component for addition polymerization.

(3) Polymerization

A 3 liter-volume autoclave equipped with an agitator was dried under a reduced pressure, was purged with argon gas, and then was evacuated. Hydrogen (molecular weight regulator) was fed to the autoclave, thereby obtaining its partial pressure of 0.017 MPa, and then, 55 g of 1-butene (α-olefin) and 695 g of butane (solvent) were fed thereto. The resultant mixture was heated up to 70° C. Ethylene was fed thereto so as to obtain its partial pressure of 1.6 Mpa, and the system was stabilized. A gas chromatography analysis showed that the system had 0.95% by mol of hydrogen and 2.99% by mol of 1-butene. There was added to the mixture 0.9 mL of a hexane solution (concentration: 1 mmol/mL) of triisobutylaluminum (organoaluminum compound). Then, 0.5 mL of a toluene solution (concentration: 2 μmol/mL) of racemic ethylenebis (1-indenyl)zirconium dichloride (transition metal compound), and 4.7 mg of the catalyst component for addition polymerization produced in the above Example 1 (1) were added thereto in this order. Polymerization was carried out at 70 ° C. for 1 hour, during which a mixed gas of ethylene and hydrogen (hydrogen concentration: 0.29% by mol) was continuously fed thereto so as to keep the total pressure constant, thereby obtaining 88 g of an ethylene-1-butene copolymer. A polymerization activity per 1 mol of zirconium atoms contained in the transition metal compound used was $1.8 \times 10^8$ g/mol-Zr, and that per 1 g of the catalyst component for addition polymerization was 18,700 g/g-catalyst component. The copolymer had SCB (short-chain branch number per 1,000 carbon atoms) of 16.9; MFR (melt flow rate) of 0.74 g/10 minutes; MFRR (melt flow rate ratio) of 76; and SR (swelling ratio) of 1.27.

The above agitator power (0.17 kW/m³) was controlled by changing a rotation speed of an impeller (n (sec⁻¹)) according to the following formula:

$$P_v = N_p \times \rho \times n^3 \times d^5 \div V$$

wherein $P_v$ is an agitator power (kW/m³); $N_p$ is a power number of impeller (dimensionless number); ρ is a density of a solvent (kg/m³); n is a rotation speed of an impeller (sec⁻¹); d is a diameter of an impeller (m); and V is a volume of a reaction liquid (m³).

The above SCB (short-chain branch number per 1,000 carbon atoms) was calculated from a content of 1-butene units (α-olefin units) in the ethylene-1-butene copolymer, the content thereof being obtained from characteristic absorptions of ethylene and 1-butene in an infrared absorption spectrum measured with an infrared spectrophotometer, FT-IR 7300, manufactured by Japan Spectroscopic Co., Ltd., using a calibration curve.

The above MFR (melt flow rate) was measured using the ethylene-1-butene copolymer containing 1,000 ppm of an antioxidant, according to the method prescribed in Japanese Industrial Standards (JIS) K7210-1995 at 190° C. under a load of 21.18 N (2.16 kg).

The above MFRR (melt flow rate ratio) was measured by dividing (i) a melt flow rate (MFR) measured using the ethylene-1-butene copolymer containing 1,000 ppm of an antioxidant according to the method prescribed in JIS K7210-1995 at 190° C. under a load of 211.82 N (21.60 kg), by (ii) a melt flow rate (MFR) measured using the same according thereto at 190° C. under a load of 21.18 N (2.16 kg).

The above SR (swelling ratio) was measured by dividing (i) a diameter of a strand obtained in the above MFR measurement by (ii) an inner diameter of a die (2.095 mm).

Example 2

(1) Preparation of Catalyst Component for Addition Polymerization

Example 1 was repeated except that (i) the separable flask was changed to a tank-type glass separable flask having a diameter of 85.2 mm and a volume of 500 mL, and equipped with a pitched blade turbine (number of blades: four, diameter: 28.4 mm, rake: 45°), and two baffle plates, and (ii) the agitator power of 0.17 kW/m³ was changed to 0.40 kW/m³, thereby obtaining 73.7 g of a catalyst component for addition polymerization.

(2) Polymerization

Example 1 was repeated except that (i) the gas composition in the system was changed to 1.01% by mol of hydrogen and 2.70% by mol of 1-butene, and (ii) the catalyst component for addition polymerization was changed to 4.4 mg of the above-obtained catalyst component, thereby obtaining 81 g of an ethylene-1-butene copolymer. A polymerization activity per 1 mol of zirconium atoms contained in the transition metal compound used was $1.8 \times 10^8$ g/mol-Zr, and that per 1 g of the catalyst component for addition polymerization was 18,400 g/g-catalyst component. The copolymer had SCB (short-chain branch number per 1,000 carbon atoms) of 16.4; MFR (melt flow rate) of 0.69 g/10 minutes; MFRR (melt flow rate ratio) of 72; and SR (swelling ratio) of 1.18.

Comparative Example 1

(1) Preparation of Catalyst Component for Addition Polymerization

Example 1 was repeated except that (i) the separable flask was changed to a tank-type glass separable flask having a diameter of 85.2 mm and a volume of 500 mL, and equipped with an anchor type impeller having a diameter of 60.8 mm, and (ii) the agitator power of 0.17 kW/m³ was changed to 0.006 kW/m3, thereby obtaining 75.4 g of a catalyst component for addition polymerization.

(2) Polymerization

Example 1 was repeated except that (i) the gas composition in the system was changed to 1.01% by mol of hydrogen and 2.44% by mol of 1-butene, and (ii) the catalyst component for addition polymerization was changed to 5.0 mg of the above-obtained catalyst component, thereby obtaining 74 g of an ethylene-1-butene copolymer. A polymerization activity per 1 mol of zirconium atoms contained in the transition metal compound used was $1.5 \times 10^8$ g/mol-Zr, and that per 1 g of the catalyst component for addition polymerization was 14,800 g/g-catalyst component. The copolymer had SCB (short-chain branch number per 1,000 carbon atoms) of 17.0; MFR (melt flow rate) of 2.5 g/10 minutes; MFRR (melt flow rate ratio) of 48; and SR (swelling ratio) of 1.40.

The above MFR (2.5 g/10 minutes) was much higher than 0.74 g/10 minutes (Example 1) and 0.69 g/10 minutes (Example 2). Namely, the smaller the agitator power was (from 0.17 kW/m³ to 0.006 kW/m³), the smaller the molecular weight of the ethylene-1-butene copolymer was.

Example 3

(1) Preparation of Catalyst Component for Addition Polymerization

A tank-type separable flask having a diameter of 58 mm and a volume of 200 mL, and equipped with two finger-type baffle plates, and a Pfaudler type impeller having a diameter of 35 mm was purged with nitrogen gas. There were put in the flask (i) 70 mL of toluene (solvent) and (ii) 7.0 g of silica (SYLOPOL 948 manufactured by Davison Co., Ltd.) having an average particle diameter of 55 μm, a pore volume of 1.67 ml/g, and a specific surface area of 325 m²/g, which silica had been previously heated at 300° C. under a nitrogen gas flow. The mixture was agitated under an agitator power of 0.77 kW/m³. The mixture was cooled down to 5° C. There was added dropwise over 20 minutes 19.1 mL of PMAO-S toluene solution (activation compound, aluminum concentration of 2.79 mol/L) manufactured by TOSOH FINECHEM CORPORATION to the cooled mixture maintained at 5° C. After the completion of the dropwise addition, the mixture was agitated under an agitator power of 0.69 kW/m³, at 5° C. for 30 minutes, and then at 80° C. for 3 hours. The mixture was cooled down to 40° C., and the obtained reaction mixture was subjected to solid-liquid separation. The separated solid was washed two times at 40° C. with each 70 mL of toluene, and then one time at room temperature with 70 mL of hexane. The washed solid was dried under a reduced pressure at 23° C. for one hour, thereby obtaining 8.48 g of a catalyst component for addition polymerization.

(2) Polymerization

Example 1 was repeated except that (i) the gas composition in the system was changed to 0.90% by mol of hydrogen and 3.58% by mol of 1-butene, and (ii) the catalyst component for addition polymerization was changed to 4.7 mg of the above-obtained catalyst component, thereby obtaining 15 g of an ethylene-1-butene copolymer. A polymerization activity per 1 mol of zirconium atoms contained in the transition metal compound used was $3.0 \times 10^7$ g/mol-Zr, and that per 1 g of the catalyst component for addition polymerization was 3,190 g/g-catalyst component. The copolymer had SCB (short-chain branch number per 1,000 carbon atoms) of 14.3; MFR (melt flow rate) of 3.6 g/10 minutes; MFRR (melt flow rate ratio) of 33; and SR (swelling ratio) of 1.62.

Comparative Example 2

(1) Preparation of Catalyst Component for Addition Polymerization

Example 3 was repeated except that the agitator power was changed to 0.025 kW/m³, thereby obtaining 8.52 g of a catalyst component for addition polymerization.

(2) Polymerization

Example 1 was repeated except that (i) the gas composition in the system was changed to 0.92% by mol of hydrogen and 3.58% by mol of 1-butene, and (ii) the catalyst component for addition polymerization was changed to 5.2 mg of the above-obtained catalyst component, thereby obtaining 14 g of an ethylene-1-butene copolymer. A polymerization activity per 1 mol of zirconium atoms contained in the transition metal compound used was $2.8 \times 10^7$ g/mol-Zr, and that per 1 g of the catalyst component for addition polymerization was 2,690 g/g-catalyst component. The copolymer had SCB (short-chain branch number per 1,000 carbon atoms) of 15.8; MFR (melt flow rate) of 5.3 g/10 minutes; MERR (melt flow rate ratio) of 33; and SR (swelling ratio) of 1.64.

The above MFR (5.3 g/10 minutes) was much higher than 3.6 g/10 minutes (Example 3). Namely, the smaller the agitator power was (from 0.69 kW/m³ to 0.025 kW/m³) the smaller the molecular weight of the ethylene-1-butene copolymer was.

The invention claimed is

1. A process for producing a catalyst component for addition polymerization, comprising the step of contacting a compound (a) represented by the following formula [1], a compound (b) represented by the following formula [2], a compound (c) represented by the following formula [3], and particles (d) comprising an inorganic substance or an organic polymer with one another, in a hydrocarbon solvent under agitation, the agitation being carried out under an agitator power of 0.05 kW/m³ or larger in contacting the particles (d) with the compound (a), (b) or (c), and in all contacting following the above contacting:

$$M^1 L^1_m \qquad [1]$$

$$R^1_{t-1} TH \qquad [2], \text{ and}$$

$$R^2_{t-2} TH_2 \qquad [3]$$

wherein $M^1$ is a metal atom of the group 1, 2, 12, 14 or 15 in the periodic table; $L^1$ is a hydrogen atom, a halogen atom or a hydrocarbyl group, and when plural $L^1$s exist, they are the same as, or different from one another; m is a number corresponding to the valence of $M^1$; $R^1$ is an electron-withdrawing group or a group containing an electron-withdrawing group, and when plural $R^1$s exist, they are the same as, or different from one another; $R^2$ is a hydrocarbyl group or a halogenated hydrocarbyl group; T is an atom of the group 15 or 16 in the periodic table; and t is a number corresponding to the valence of T.

2. The process for producing a catalyst component for addition polymerization according to claim 1, wherein the agitator power is 0.05 to 50 kW/m³.

3. A process for producing a catalyst for addition polymerization, comprising the step of contacting a catalyst component for addition polymerization produced by the process according to claim 1, a compound of a transition metal of the groups 3 to 11 or the lanthanide series in the periodic table, and an optional organoaluminum compound with one another.

4. The process for producing a catalyst for addition polymerization according to claim 3, wherein the compound of a transition metal of the groups 3 to 11 or the lanthanide series in the periodic table contains one or more cyclopentadiene-containing anionic groups.

5. A process for producing an addition polymer, comprising the step of polymerizing an addition polymerizable monomer in the presence of a catalyst for addition polymerization produced by the process according to claim 3.

6. The process for producing an addition polymer according to claim 5, wherein the addition polymerizable monomer is an olefin.

7. The process for producing an addition polymer according to claim 5, wherein the addition polymerizable monomer is a combination of ethylene with an α-olefin.

* * * * *